(12) United States Patent
Pringle et al.

(10) Patent No.: US 9,037,968 B1
(45) Date of Patent: May 19, 2015

(54) SYSTEM AND METHOD TO COMMUNICATE INFORMATION TO A USER

(75) Inventors: William Pringle, San Francisco, CA (US); Sean Hanley, San Francisco, CA (US); Jay Monahan, Los Gatos, CA (US)

(73) Assignee: Zynga Inc., San Francisco, CA (US)

( * ) Notice: Subject to any disclaimer, the term of this patent is extended or adjusted under 35 U.S.C. 154(b) by 387 days.

(21) Appl. No.: 13/435,869

(22) Filed: Mar. 30, 2012

Related U.S. Application Data

(60) Provisional application No. 61/512,758, filed on Jul. 28, 2011.

(51) Int. Cl.
*G06F 17/00* (2006.01)
*G06F 17/21* (2006.01)

(52) U.S. Cl.
CPC .................................. *G06F 17/212* (2013.01)

(58) Field of Classification Search
CPC .......... G06F 17/5009; G06F 17/30011; G06F 17/30017; G06F 17/04842; G06F 17/04815; G06F 17/212
USPC ................ 715/273; 725/133, 141, 153; 463/1
See application file for complete search history.

(56) References Cited

U.S. PATENT DOCUMENTS

| | | | | |
|---|---|---|---|---|
| 6,002,402 | A * | 12/1999 | Schacher | 715/810 |
| 6,462,656 | B2 * | 10/2002 | Ulrich et al. | 340/539.1 |
| RE39,830 | E * | 9/2007 | Balabanovic | 345/419 |
| 8,314,789 | B2 * | 11/2012 | Fitzmaurice et al. | 345/419 |
| 8,316,237 | B1 * | 11/2012 | Felsher et al. | 713/171 |
| 8,430,741 | B2 * | 4/2013 | Agarwal et al. | 463/20 |
| 2002/0025844 | A1 * | 2/2002 | Casey et al. | 463/16 |
| 2004/0009813 | A1 * | 1/2004 | Wind | 463/30 |
| 2006/0112335 | A1 * | 5/2006 | Hofmeister et al. | 715/701 |
| 2007/0001106 | A1 * | 1/2007 | Schmidt et al. | 250/225 |
| 2007/0220042 | A1 * | 9/2007 | Mueller et al. | 707/102 |
| 2007/0236485 | A1 * | 10/2007 | Trepte | 345/207 |
| 2007/0248261 | A1 * | 10/2007 | Zhou et al. | 382/154 |
| 2007/0255702 | A1 * | 11/2007 | Orme | 707/5 |
| 2008/0086379 | A1 * | 4/2008 | Dion et al. | 705/14 |
| 2008/0132331 | A1 * | 6/2008 | Gatto et al. | 463/31 |
| 2008/0201321 | A1 * | 8/2008 | Fitzpatrick et al. | 707/5 |
| 2008/0204450 | A1 * | 8/2008 | Dawson et al. | 345/419 |
| 2008/0207322 | A1 * | 8/2008 | Mizrahi | 463/32 |
| 2009/0094523 | A1 * | 4/2009 | Treder et al. | 715/738 |
| 2009/0111551 | A1 * | 4/2009 | Faulkner | 463/13 |
| 2010/0009733 | A1 * | 1/2010 | Garvin et al. | 463/5 |
| 2010/0094689 | A1 * | 4/2010 | Fodor | 705/14.1 |
| 2011/0004481 | A1 * | 1/2011 | Jones | 705/1.1 |
| 2011/0197141 | A1 * | 8/2011 | Mazzaferri | 715/740 |
| 2011/0276883 | A1 * | 11/2011 | Cabble et al. | 715/727 |
| 2012/0117502 | A1 * | 5/2012 | Nguyen et al. | 715/769 |
| 2012/0184349 | A1 * | 7/2012 | Barclay et al. | 463/20 |
| 2012/0290950 | A1 * | 11/2012 | Rapaport et al. | 715/753 |
| 2013/0014046 | A1 * | 1/2013 | Watts et al. | 715/772 |
| 2013/0063432 | A1 * | 3/2013 | Kaps et al. | 345/419 |

* cited by examiner

*Primary Examiner* — Laurie Ries
(74) *Attorney, Agent, or Firm* — Schwegman Lundberg & Woessner, P.A.

(57) ABSTRACT

A system, computer-readable storage medium storing at least one program, and a computer-implemented method for communicating information in a virtual environment are presented. A graphical user interface is provided to a user, where the graphical user interface displays a virtual environment that includes one or more virtual objects. A virtual object may be linked to a section of a digital document. Selection of the virtual objects in the virtual environment by the user is monitored. Information regarding the section of the digital document is communicated to the user based on receiving an indication that a virtual object is selected.

30 Claims, 17 Drawing Sheets

FIG. 10B

- 1. INTRODUCTION
- 2. INFORMATION WE COLLECT
- 3. EMAILING

5. SHARING YOUR INFORMATION — 834

WE WILL SHARE YOUR INFORMATION (IN SOME CASES PERSONAL INFORMATION) WITH THIRD PARTIES. THIS IS PARTIES OTHER THAN US IN THE FOLLOWING CIRCUMSTANCES:

THIRD PARTY SERVICE PROVIDERS
WE WILL PROVIDE YOUR INFORMATION TO THIRD PARTY COMPANIES TO PERFORM SERVICES AND TO ASSIST US IN OUR MARKETING EFFORTS. WE DIRECT ALL SUCH THIRD PARTY SERVICE PROVIDERS TO MAINTAIN THE CONFIDENTIALITY OF THE INFORMATION DISCLOSED TO THEM AND TO NOT USE YOUR INFORMATION FOR ANY PURPOSE OTHER THAN TO PROVIDE SERVICES ON OUR BEHALF

FRIENDS AND OTHER PLAYERS
IN SOME GAMES OTHER PLAYERS WILL BE ABLE TO SEE YOUR GAME NAME OR PSEUDONYM AND A GAME PROFILE. YOUR GAME PROFILE MAY INCLUDE YOUR PROFILE PHOTO, WHICH IN CERTAIN CASES CAN REVEAL YOUR USER ID NUMBER. ACCESS TO THIS INFORMATION MAY ALLOW OTHERS TO VIEW THE PUBLIC INFORMATION ASSOCIATED WITH YOUR RELATED SNS ACCOUNT.

ADVERTISING OF THIRD-PARTY PRODUCTS AND SERVICES
WE DO NOT ACTIVELY SHARE PERSONAL INFORMATION WITH THIRD PARTY ADVERTISERS FOR THEIR MARKETING PURPOSES UNLESS YOU GIVE US YOUR CONSENT. IF WE WISH TO SHARE IN THIS FASHION, WE WILL ASK FOR YOUR CONSENT. ADVERTISERS, HOWEVER, MAY OBTAIN PUBLIC INFORMATION ABOUT YOU FROM YOUR PROFILE OR OTHER PUBLIC SOURCES.

WE MAY USE AND SHARE WITH THIRD PARTIES CERTAIN TECHNICAL INFORMATION (INCLUDING IP

---

836 — SHARING

WE MAY SHARE YOUR PERSONAL INFORMATION IN CERTAIN CIRCUMSTANCES, INCLUDING (1) WITH TRUSTED THIRD PARTY SERVICE PROVIDERS WHO ASSIST US IN PROVIDING YOU WITH A GREAT GAME EXPERIENCE, AND WHO ARE DIRECTED TO KEEP YOUR INFORMATION SECURE AND CONFIDENTIAL, (2) IN RESPONSE TO LEGAL PROCESS LIKE A COURT ORDER AND IN CERTAIN SAFETY AND SECURITY SITUATIONS, AND (3) IN SOME GAMES WHERE YOUR IN-GAME PROFILE MAY REVEAL OR LINK TO INFORMATION LIKE YOUR NAME AND PROFILE PHOTO OR YOUR SOCIAL NETWORK ACCOUNT.

FOR MORE INFORMATION ON THE WAYS YOUR DATA MAY BE SHARED VISIT OUR PRIVACY POLICY

OKAY

PROGRESS! 70%

US 9,037,968 B1

SYSTEM AND METHOD TO COMMUNICATE INFORMATION TO A USER

RELATED APPLICATIONS

This application claims the benefit of U.S. Provisional Application No. 61/512,758, filed Jul. 28, 2011, entitled "SYSTEM AND METHOD TO COMMUNICATE INFORMATION TO A USER," which is herein incorporated by reference in its entirety.

TECHNICAL FIELD

The present disclosure relates to communicating information to a user. In an example embodiment, an information platform is provided to communicate information relating to sections of a digital document through a virtual environment.

BACKGROUND

A content provider, such as a gaming platform provider, typically creates documents describing a company's policies and practices. For example, it is common practice for a gaming platform provider to create a document (e.g., a privacy agreement) that describes how the gaming platform may use information provided by the user. That is, the privacy agreement may describe when the gaming platform provider may email the end user and under what circumstances the gaming platform provider may release the user's email to third-parties. Unfortunately, because users generally enroll in the gaming platform before the provider of the gaming platform can communicate, and the user subsequently receive, the privacy agreement, content providers typically rely on electronic techniques to quickly distribute such documents.

Using electronic mediums, such as the Internet, gaming platform providers generally provide access to a privacy agreement through a web page that may be made available during an enrollment process or through links on a website, or through an in-game menu. In this way, a user may access the privacy agreement substantially close in time to enrolling or using the game platform for the first time. However, once a user, for example, selects the link to the privacy agreement, the web site merely displays a potentially complex and detailed document. In some cases, a privacy agreement may include a table of contents and an index to allow the user some ability to navigate the complex document for relevant information. However, traversing a table of contents and/or index is still a manual process that requires some intuition on the part of the reader to obtain the desired information.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

FIG. 10B shows another example of a user interface displaying information relating to a section of a digital document, according to some embodiments;

DESCRIPTION OF EXAMPLE EMBODIMENTS

Overview

Some embodiments may provide a computer-implemented system that communicates information relating to a digital document through a virtual environment. For example, the computer-implemented system may display a virtual city on a mobile phone. The user of the mobile phone may then obtain information relating to a section of a digital document by, for example, selecting a virtual building that is displayed within the virtual environment. Further, selecting other virtual buildings may cause the system to display information relating to other sections of the digital document.

Figure 1:
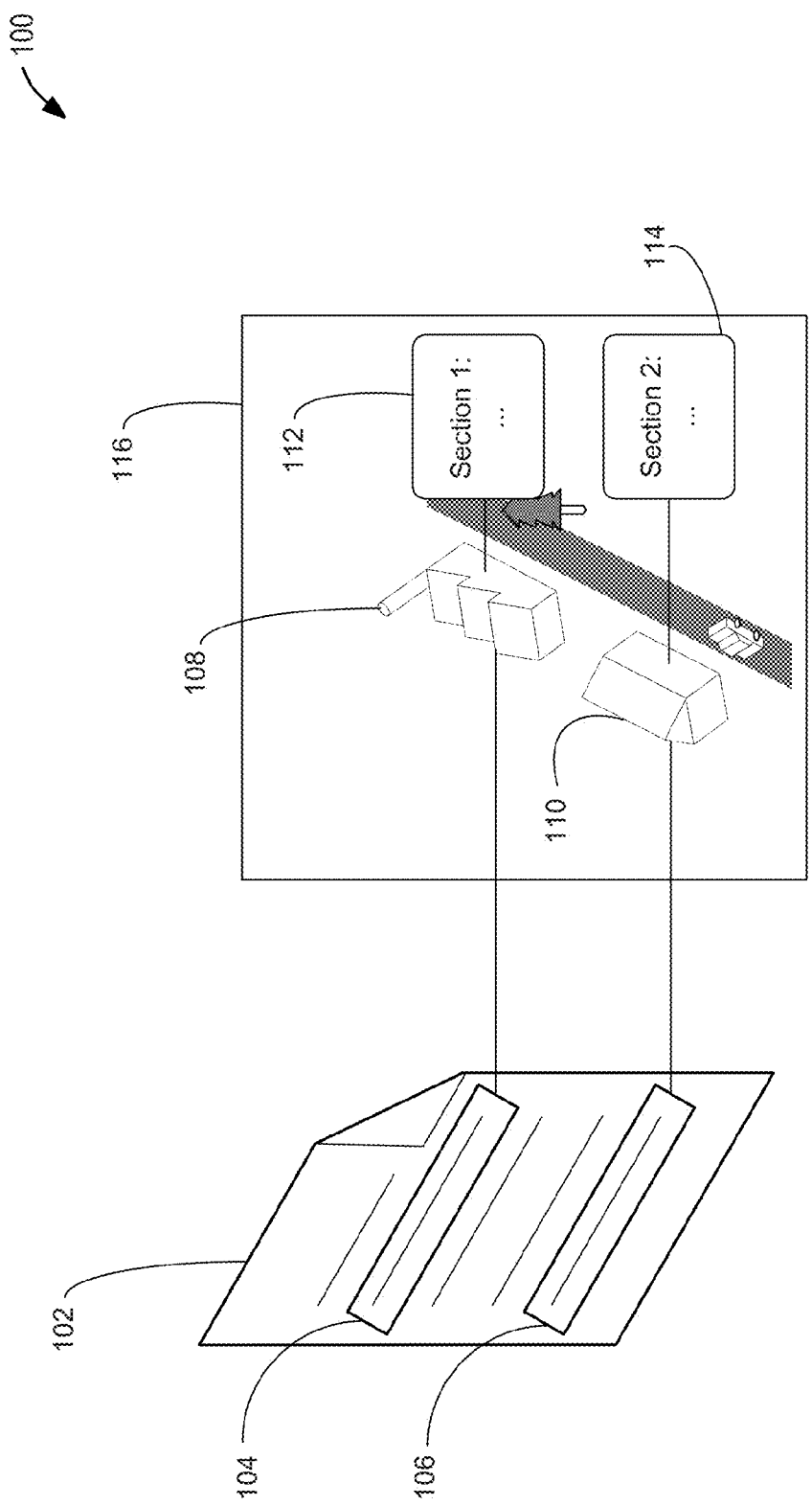
FIG. 1 is a diagram illustrating a simple example of associating virtual objects of a virtual environment with sections of a digital document, according to some embodiments.

To illustrate, FIG. 1 is a diagram illustrating a simple example of a system 100 that displays information relating to a digital document 102 (e.g., a privacy statement, agreement, or the like) through a virtual environment 116, according to some embodiments. As is described in greater detail below, a virtual environment may be a representation of a physical or real-world setting, as may be displayed by a client device (e.g., a mobile device). The digital document 102 may include sections 104 and 106 (e.g., provisions of a privacy statement, agreement, or the like) that are respectively associated with virtual objects 108 and 110 (e.g., virtual buildings, streets, environmental objects, or any other suitable representation of a physical object) of the virtual environment 116. Such associations may store information relating to the sections, such as a summary, a label, an image, questions and answers, and the like. In some cases, the information relating to a section is stored the digital document and, in other cases, the information relating to the section is stored in a data structure external to the digital document.

Some embodiments may provide a computer-implemented system that generates and/or provides the virtual environment 116. Users with access to the virtual environment 116 may obtain information relating to the digital document 102 by, for example, selecting the virtual objects, such as virtual objects 108 or 110. To illustrate, a gaming platform, as provided by Zynga, Inc., may generate an virtual environment that a user may interact with by selecting the virtual objects 108 and 110. In response to a user selection, the system may communicate information relating to the section 104 of the digital document 102. In some embodiments, the information relating to the section 104 may be displayed in a section window 112. Likewise, when the user selects the virtual object 110, a section window 114 may be displayed to provide information regarding section 106.

In some example embodiments, a computer implemented system may provide one or more content providers with a user interface for embedding information relating to a digital document into a virtual environment. For example, a content provider may select a section within the digital document and associate the selected section with a virtual object in a virtual environment. This user interface may also allow the content provider to provide supplementary information regarding the section, such as a summary, a reference to the section in the digital document, and one or more questions and answers related to the section. Example embodiments may communicate this supplementary information to the user. When the user selects the virtual object within the virtual environment, the system may then display a summary of the section and a link to the corresponding section as it is presented in the digital document.

These and other embodiments of the invention are described in further detail below.

Example System

Figure 2:
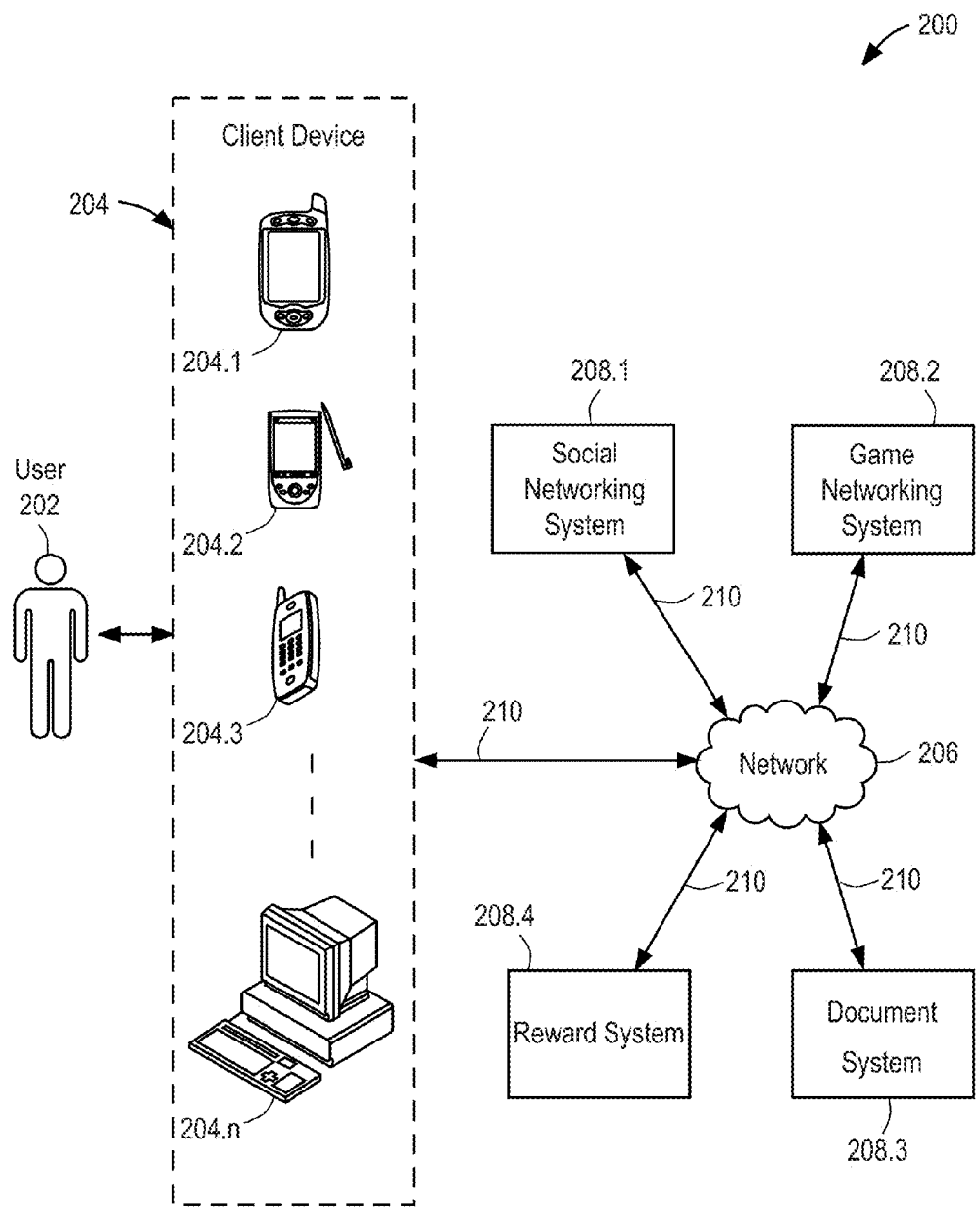
FIG. 2 illustrates an example of a system, according to some embodiments.

FIG. 2 illustrates an example of a system 200 for implementing various example embodiments. In some embodiments, the system 200 comprises a user 202, a client device 204, a network 206, a social networking system 208.1, a game networking system 208.2, a document system 208.3, and a reward system 208.4. The components of the system 200 may be connected directly or over a network 206, which may be any suitable network. In various embodiments, one or more portions of the network 206 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

Although FIG. 2 illustrates a particular example of the arrangement of the user 202, the client device 204, the social networking system 208.1, the game networking system 208.2, the document system 208.3, the reward system 208.4, and the network 206, this disclosure includes any suitable arrangement or configuration of the user 202, the client device 204, the social networking system 208.1, the game networking system 208.2, the document system 208.3, the reward system 208.4, and the network 206.

The client device 204 may be any suitable computing device (e.g., devices 204.1-204.n), such as a smart phone 204.1, a personal digital assistant 204.2, a mobile phone 204.3, a personal computer 204.n, a laptop, a computing tablet, or any other device suitable for playing a virtual game. The client device 204 may access the social networking system 208.1 or the game networking system 208.2 directly, via the network 206, or via a third-party system. For example, the client device 204 may access the game networking system 208.2 via the social networking system 208.1.

The social networking system 208.1 may include a network-addressable computing system that can host one or more social graphs (see for example FIG. 3), and may be accessed by the other components of system 200 either directly or via the network 206. The social networking system 208.1 may generate, store, receive, and transmit social networking data.

Figure 3:
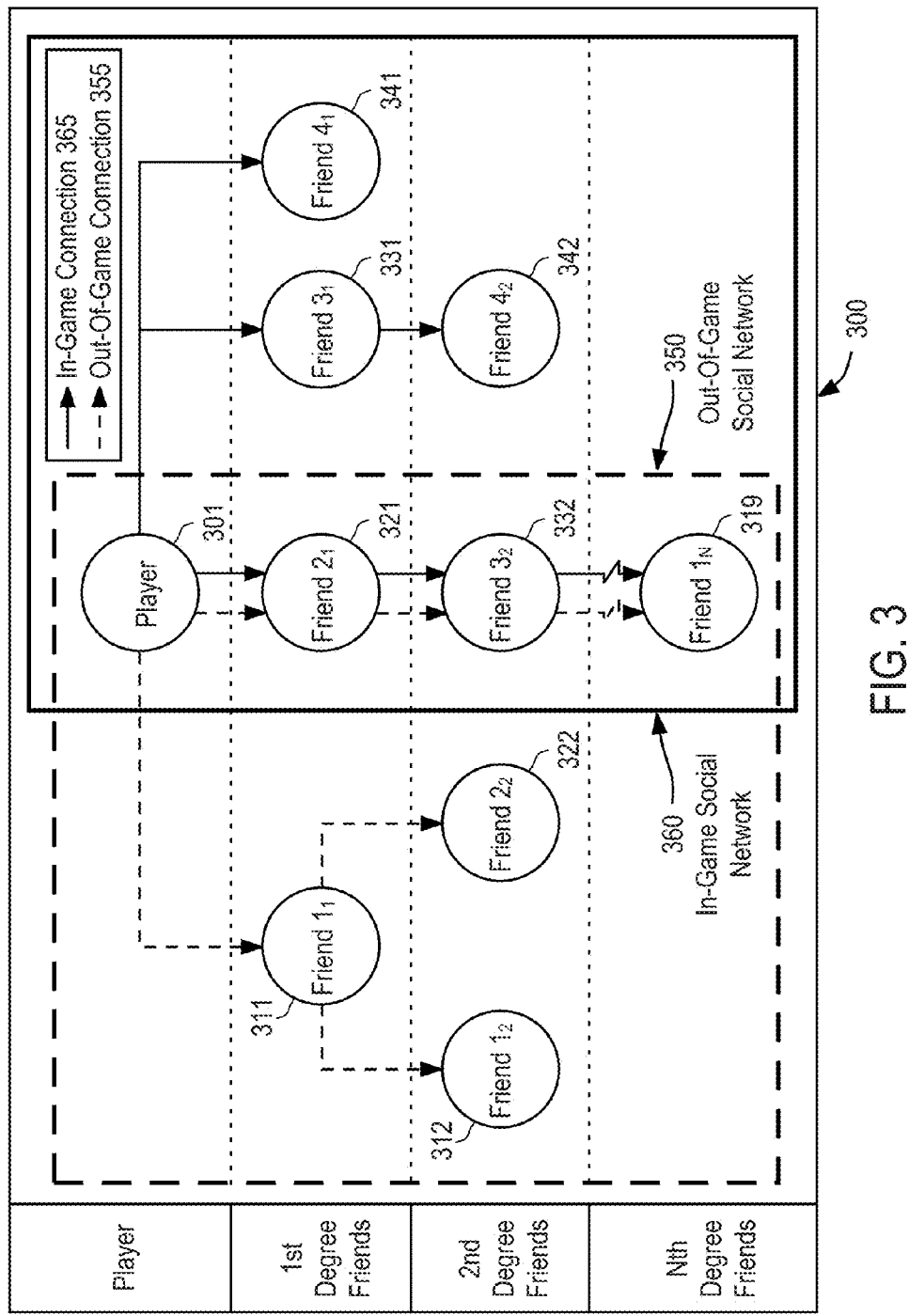
FIG. 3 shows an example of a social network within a social graph, according to some embodiments.

FIG. 3 shows an example of a social network within a social graph 300. Social graph 300 is shown by way of example to include an out-of-game social network 350, and an in-game social network 360. Moreover, in-game social network 360 may include one or more users that are friends with Player 301 (e.g., Friend 331), and may include one or more other users that are not friends with Player 301. The social graph 300 may correspond to the various users associated with the virtual game. In an example embodiment, each user may create, select, and/or place their own virtual objects in their own virtual environment. Thus, when, for example, Player 301 visits the virtual environment of Friend 331, the virtual environment displayed to Player 301 includes the virtual objects created, selected, and/or placed in that environment by Friend 331.

With reference back to FIG. 2, the game networking system 208.2 may include a network-addressable computing system (or systems) that can host one or more virtual games, for example, online games. The game networking system 208.2 may generate, store, receive, and transmit game-related data, such as, for example, game account data, game input, game state data, virtual environment data, and game displays. The game networking system 208.2 may be accessed by the other components of system 200 either directly or via the network 206. The user 202 may use the client device 204 to access, communicate data to, and receive data from the social networking system 208.1 and/or the game networking system 208.2.

The document system 208.3 may be a network-addressable computing system that can host or facilitate automated communication of sections of a digital document through a virtual environment. In some embodiments, the document system 208.3 may provide a user interface for embedding information relating to a digital document into a virtual environment. For example, a content provider may select a section within the digital document and associate the selected section with a virtual object in a virtual environment. This user interface may also allow the content provider to provide supplementary information regarding the section, such as a summary, a reference to the section in the digital document, and one or more questions and answers related to the section. The document system 208.3 may access, or be accessed by, the other components of system 200 either directly or via the network 206.

The reward system 208.4 may be a network-addressable computing system that can assign virtual rewards to a user based on the user's interaction with a virtual environment with virtual objects associated with sections of the digital document. The reward system 208.4 may access, or be accessed by, the other components of system 200 either directly or via the network 206.

Communicating Information to a User

In an example system, sections of a digital document may be associated with virtual objects in a virtual environment. Based on the associations between virtual objects and sections of a digital document, information relating to the section may be displayed to a user based on a selection of an associated virtual object.

In an example embodiment, a database may be provided to store the associations between the sections of a digital document and virtual objects of the virtual environment. Any other suitable data structure may also be used to store such associations. In some embodiments, a document association module may be configured to store and otherwise manage supplemental information regarding the associations between the virtual objects and the sections of the digital document. For example, the document association module may determine whether information related to a section has been previously displayed to a user or, in another embodiment, whether displaying information relating to a section is to result in an award of a virtual award to the user.

Figure 4:
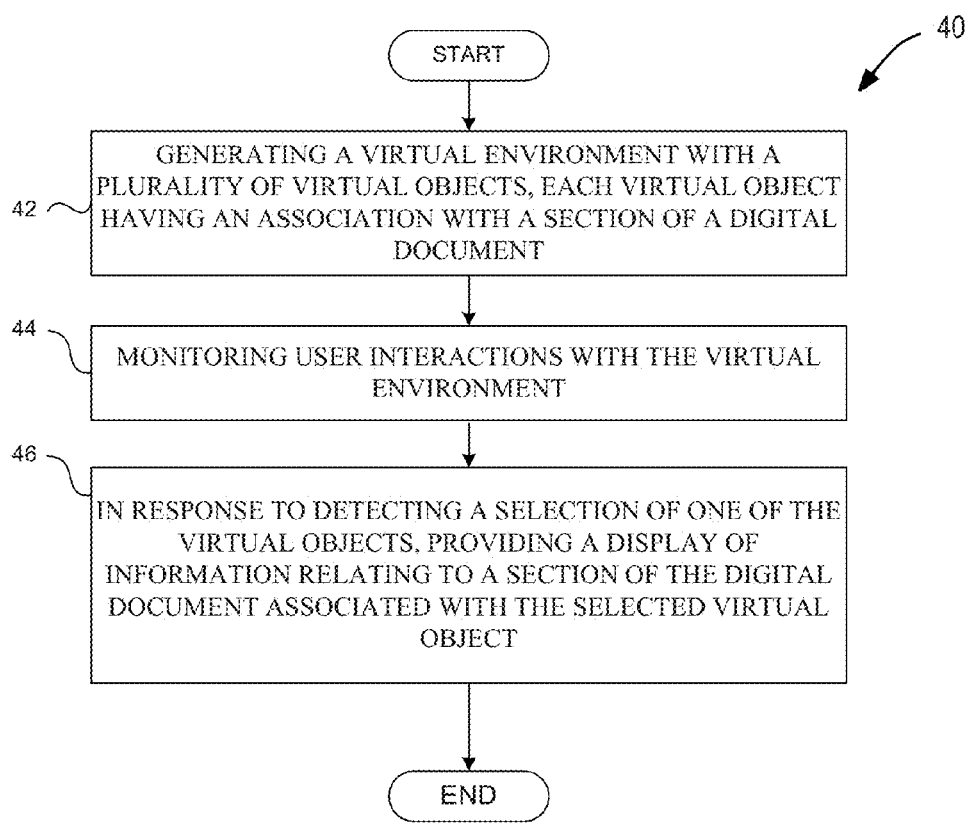
FIG. 4 shows a flowchart illustrating an example method for communicating a section of a digital document through a virtual environment, according to some embodiments.

FIG. 4 shows a flowchart illustrating an example method 40 for communicating a section of a digital document through a virtual environment. In some embodiments, method 40 may be performed using the document system 108.3. The method 40 may begin at operating 42 by generating a virtual environment with a plurality of virtual objects, each virtual object having an association with a section of a digital document. An example of a virtual environment may be a representation of a city that includes a number of buildings (virtual objects) selectable by the user. The method 40 may then monitor user interactions with the virtual environment at operation 44. User selections of virtual objects are examples of user interactions that may be monitored. At operation 46, in response to detecting a selection of one of the virtual objects, the method 40 may then provide a display of information relating to a section of the digital document at operation 46. Such information may be displayed in a pop-up window and the information may include attributes associated with the section of the digital document, such as a summary, title, icon, and the like.

Figure 5:
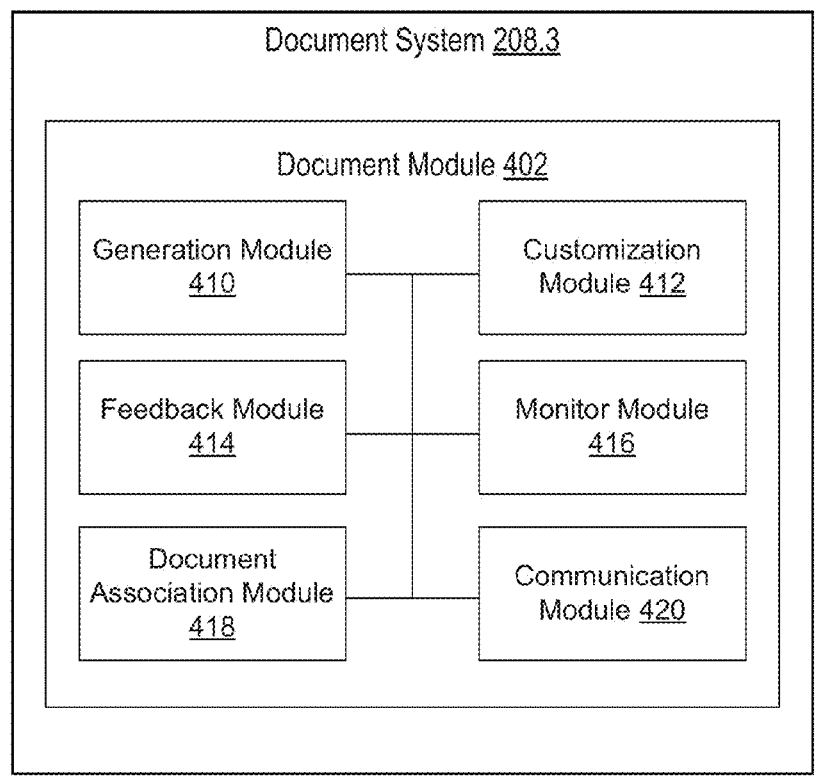
FIG. 5 is a block diagram illustrating example modules of a document system for displaying information relating to a section of a digital document through a virtual environment, according to some embodiments.

FIG. 5 is a block diagram illustrating example modules of a document system for communicating information related to selected sections of a digital document, according to some embodiments. A document module 402, shown to be part of the document system 208.3 in FIG. 5, may include a generation module 410, a customization module 412, a feedback module 414, a monitor module 416, and a document association module 418. In some embodiments, some or all of the modules of the document module 402 may be part of the game networking system 108.2. The modules may be hardware, software, or a combination of hardware and software. In some embodiments, the modules may be implemented by one or more processors of a system (e.g., one or more servers), such the document system 108.3 or the game networking system 108.2. The modules of the document module 402 are described in further detail with reference to the various factors that influence the selection of an advertisement for a particular individual.

Example Data Structures

Figure 6:
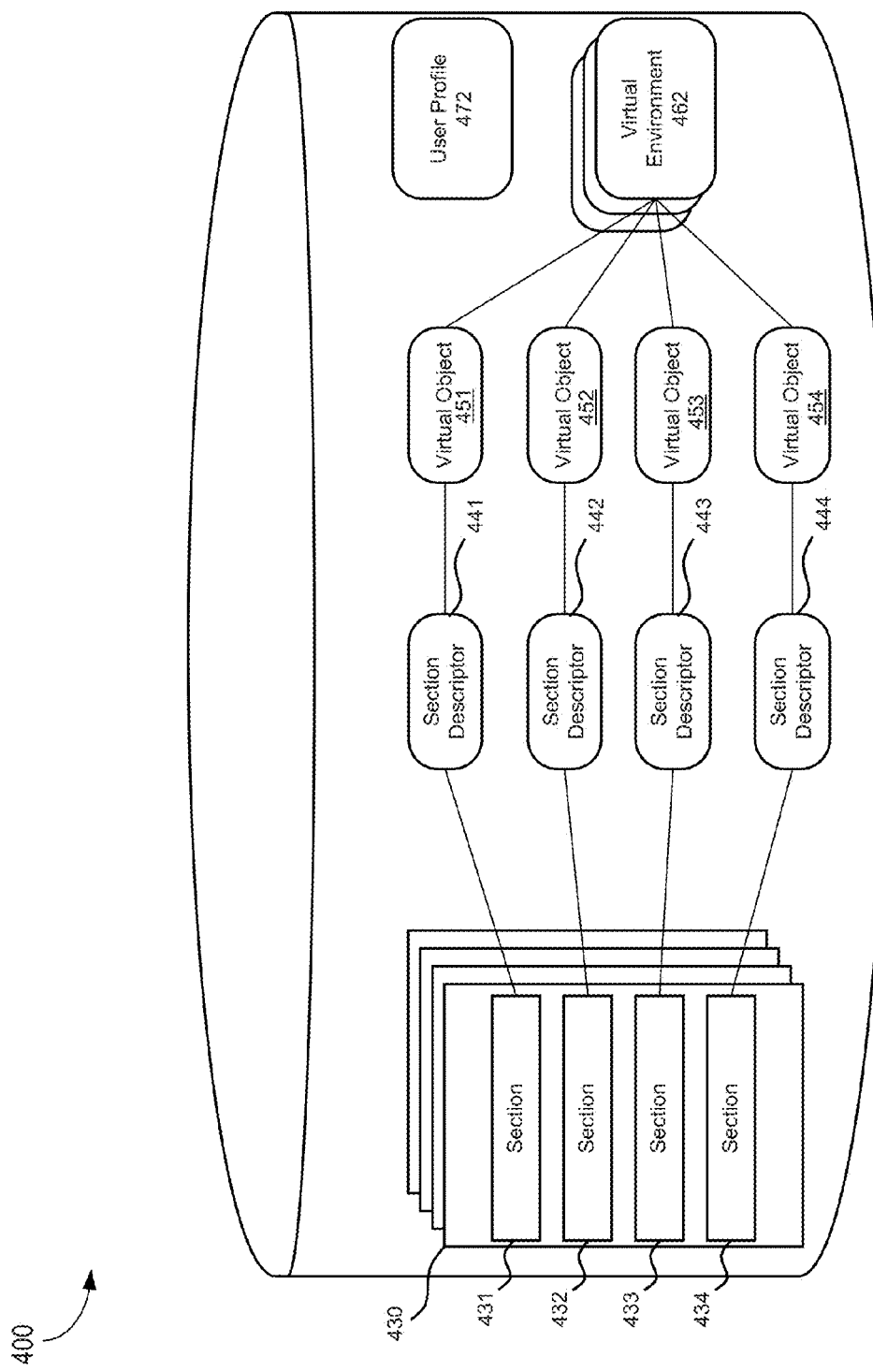
FIG. 6 shows an example database that associates section of a digital document with virtual objects of a virtual environment, according to some embodiments.

FIG. 6 shows an example database 400 that stores data that associates a section of a digital document to virtual object of a virtual environment. In some embodiments, the database 400 is managed by the game networking system 208.2, the document system 208.3, or some combination thereof and, accordingly, is described by way of example with reference thereto. For example, the database 400 may include a structured query language (SQL) database that is managed using a SQL-based database management software (e.g., MySQL, SQLite, or the like), or may include other database technologies now known or later developed (e.g., a proprietary data structure that is managed using proprietary database management software).

The database 400 may include database tables for storing a digital document 430, section descriptor records 441-444, virtual object records 451-454, a virtual environment 462, and a user profile 472. As shown in FIG. 6, one or more digital documents and virtual environments may be stored in the database 400. However, for clarity of description, the database 400 is described herein as only including one of each.

The digital document 430 may be any digital data that may be presented to a user (e.g., visually or audibly presented), such as an electronic document, page-descriptive electronic content such as a page-descriptive electronic document, a media stream, a web page, a hypertext document, an image, digital video or a video recording, digital audio or an audio recording, animation, or a markup language document, such as a HyperText Markup Language (HTML) or eXtensible Markup Language (XML) document. Specific examples of a digital document include a privacy agreement or statement, a user manual, educational material, training material, a tutorial, or the like.

As show in FIG. 6, the digital document may include sections 431-434. A "section," as used herein, can refer to any part of a digital document that is defined or discernable as a part. For example, a section may be discerned from a characteristic of the content element itself (e.g., a paragraph of an electronic document, a file format designation, or a header) or may be manually defined by an author or any other user or provider of the digital document (e.g., author-selected words in an electronic document, such as user defined tags). Examples of sections include portions of a page-descriptive document or other electronic document, such as sections of electronic text or other material within an electronic document, comments, dynamic content in the form of portions of media streams, such as sections of digital video or frames or sets of frames of digital video or digital audio, dynamic content in the form of segments or frames of animations, electronic forms, form templates, form elements, form data, or executable instructions, and various elements presentable or accessible by reviewers within electronic content, including instances of scripted and non-scripted dynamic content and the like.

The sections 431-434 are then associated with the virtual objects 451-454. In particular, FIG. 6 shows the sections 431-434 are associated with the virtual objects 451-454 through section descriptors 441-444. A "section descriptor," as used herein, can refer to any data structure that stores data relating to a section of the digital document. A section descriptor, in some embodiments, may include attributes that characterize properties of a section. An attribute may include alpha numerical text, an image, a reference, an identifier, binary data, or any other type of data usable to characterize a property of a digital document. For example, according to some embodiments, a section descriptor can include a summary attribute that includes text that summarizes a particular section of the digital document. In some embodiments, the value of an attribute may be set manually by a developer. In other cases, the value of an attribute may be derived from the contents of the digital document. A section descriptor may be stored within the digital document or separately from the digital document.

Figure 7A:
FIG. 7A shows an example of a section descriptor, according to some embodiments.

The database 400 may provide an interface to maintain and/or create the section descriptor records 441-444. For example, the database 400 provides an interface for a content provider to create a corresponding entry in the database table to store implementation details for the section descriptors. Such implementation details may be stored in the section descriptor records 441-444. FIG. 7A is a diagram that shows an example section descriptor 500. As FIG. 7A shows, the section descriptor 500 can include a section descriptor identifier field 502, a label field 504, an icon field 506, a short summary field 508, a document identifier field 510, and a question field 512.

The section descriptor identifier field 502 stores an identifier that can be used to identify the section descriptor record 500a. As used herein, an "identifier" can refer to a code that distinguishes between variations of one instance of an item with another. For example, a section descriptor identifier can distinguish a first section descriptor from a second section descriptor. An identifier can be represented by a series of numbers, letters, symbols, or some combination thereof. The identifier stored in the section descriptor identifier field 502 may be generated at the time the section descriptor identifier field 502 is created and stored.

The label field 504 stores information that the system can use as a label for the section descriptor. As used herein, a "label" can refer to a word or short phrase that describes the section. The system 200, according to some embodiments, may display the information stored in the label field 504 of a section descriptor in the virtual environment. For example, the system can display a textual representation of the label proximate to the display of the virtual object in the virtual environment.

The icon field 506 stores information that the system 200 can use to display an image regarding the section, which may be displayed when the user selects the virtual object associated with the section descriptor. For example, the system 200 may display the icon in a window being displayed with further information regarding the section descriptor.

The short summary field 508 stores information that the system 200 can use to provide a summary of the content of the section of the digital document. In an example embodiment, the short summary field 508 includes textual information, such as a series of words, phrases, and/or sentences. The short summary field 508 may be useful for a user because the short summary field 506 can provide important information regarding the section without displaying all the information of the section.

The document identifier field 510 is a field that stores an identifier assigned to reference the digital document. In some embodiments, the document field 510 can further reference the section of the digital document that corresponds to the section descriptor 500. In some embodiments, the reference can store a URI or path usable to access the document (e.g., a directory path useable in a filesystem).

The question field 512 may store a series of question-answer pairs that may be used to test the user's understanding of the section. A question-answer pair may take any suitable form. For example a question-answer pair may include a call field. The call field may pose the question that is to be answered by the user. In some embodiments, the call field may ask a multiple choice question, in which case a series of choices may be presented to the user. The question-answer pair may further include an answer field. In some embodiments, the answer field contains one data item that represents the correct answer. For example, in an embodiment that poses a multiple choice question in the question field, the answer field may store the choice that represents the correct answer.

It is to be appreciated that record 500a of FIG. 7A is shown for the purpose of illustration. It is to be noted that in example embodiments, more or less fields may be stored in such records. Further, according to other embodiments, the particular fields of record 500a may be arranged in any number of records (e.g., split into two or more records).

With reference back to FIG. 6, some example embodiments may record user specific information related to the user's interaction with the section descriptors 441-444 associated with the virtual objects 451-454 of the virtual environment 462. For example, the document system 208.3 may update the database 400 to indicate that information regarding specific sections have been accessed by the user. User profile 472 may store such user specific data.

Figure 7B:
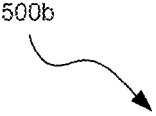
FIG. 7B shows an example of a user activity record, according to some embodiments.

FIG. 7B shows an example of a user activity record 500b that may be stored in the user profile 472. The user activity record 500b records a user's interaction with a section descriptor. As FIG. 7B shows, the user activity record 500b includes a user record identifier field 514 to identify a specific user involved in the interaction, a document identifier field 516 to identify a specific digital document associated with the interaction, a section descriptor identifier field 518 to further identify a specific section descriptor record involved in the interaction, and a status field 520 to characterize the interaction. Accessing a section descriptor is an example of an interaction that can be tracked by user activity record 500b. For example, the status field 520 can be updated from 'NOT ACCESSED' to 'ACCESSED' if the user selects the virtual object associated with the section descriptor record. Another activity that can be monitored is whether specific questions have been successfully answered. Accordingly, the status field 520 can be used to determine the user's progress of reading the digital document. Also, the database 400 may include a selection count, a view count, and an engagement count to be used in other metrics.

It is to be appreciated that record 500b is shown for the purpose of illustration. It is to be noted that in example embodiments, more or less fields may be stored in such a record. Further, according to other embodiments, particular fields may be stored over one or more different records.

With reference back again to FIG. 6, the user profile 472 may further include user information that is gathered from the user, the user's client device, or an affiliate social network. The information provided by the user may include the user's demographic information, the user's location information (e.g., a historical record of the user's location during game play as determined via a GPS-enabled device or the internet protocol (IP) address for the user's client device), the user's localization information (e.g., a list of languages chosen by the user), the types of games played by the user, and the like.

In some example embodiments, the user profile 472 may also include information relating to the user's level of engagement with the virtual environment, the user's friend preferences, the user's reputation, the user's pattern of game-play, and the like. For example, the game networking system 208.2 and/or the document system 208.3 may determine the user's friend preferences based on user attributes that the user's first-degree friends have in common, and may store these user attributes as friend preferences in the user profile 472. Furthermore, the game networking system 208.2 and/or the document system 208.3 may determine reputation-related information for the user based on user-generated content (UGC) from the user or the user's $N^{th}$ degree friends (e.g., in-game messages or social network messages), and may store this reputation-related information in the user profile 472. The derived user information may also include information that indicates the user's character temperament during game play, anthropological measures for the user (e.g., tendency to like violent games), and the like.

In some example embodiments, the user's level of engagement may be indicated from the user's performance within the virtual environment. For example, the user's level of engagement may be determined based on one or more of the following: a frequency that the user plays a particular game, a frequency that the user interacts with other users of the virtual game, a response time for responding to in-game actions from other users of the virtual game, and the like.

In some embodiments, the system 100 may use information from the user profile 472 to tailor the information from the section descriptors that are displayed to the user. For example, the system 100 may use a user's level of engagement for specific activities to determine that a user should be informed of some information related to the digital document. For example, where a user frequently interacts with other users, the system may associate selected virtual objects with sections of the digital document concerning the dangers of communicating information to other users. Other such examples are described below.

Example Methods

Figure 8:
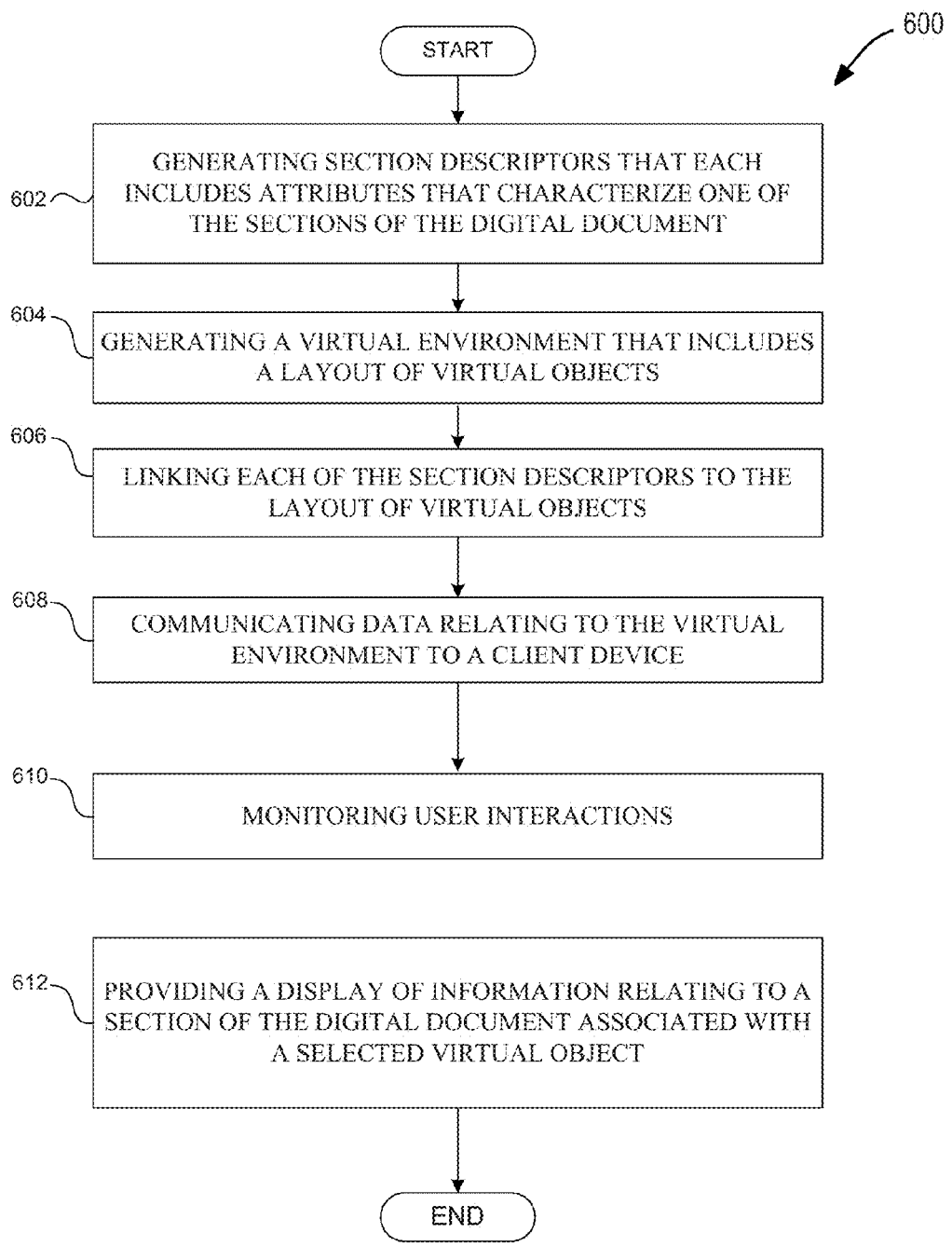
FIG. 8 is a flowchart showing an example method for communicating information relating to a digital document, according to some embodiments.

FIG. 8 shows a flowchart illustrating an example method 600 for communicating information relating to sections of a digital document through a virtual environment. In some embodiments, the method 600 may be performed using any of the systems or modules shown in FIG. 2 or FIG. 5 and, accordingly, is described by way of example with reference thereto.

The method 600 may begin, at operation 602, by generating section descriptors that each includes attributes that characterize one of the sections of the digital document, as may be performed by the document association module 418. For example, a digital document that sets forth a privacy agreement may include a number of sections, such as an introduction section, an emailing policy section, a sharing information section, an information collected section, or any other suitable section. As described above, an attribute may be data that characterizes an aspect of a particular section of the digital document.

In some embodiments, operation 602 may involve creating a section descriptor for each of the sections of the digital document. In turn, creating a section descriptor may involve assigning attribute values that characterize the corresponding section. For example, a section descriptor corresponding to the digital document's emailing section may assign the text string 'EMAIL' to the section descriptor's label attribute. (See, e.g., reference 504 of FIG. 7A). Other attributes values may be assigned, such as attribute values for icons, short summaries, document identifiers, question lists, or any other suitable attribute.

At operation 604, the method 600 may generate a virtual environment that arranges virtual objects in a layout, as may be performed by the generation module 410. For example, virtual objects representing buildings, streets, lamp posts, geographic landmarks, or any other suitable structure may be arranged in a particular layout. As such, the layout of the virtual environment may represent city, a town, a settlement, a farm, a garden, an estate, a territory, or a geographic region. It is to be noted that other layouts are possible. For example, a virtual environment may depict a layout of a building, work site (e.g., an office or a lab), a room (e.g., a kitchen, bedroom, living room, basement, attic), or an interior of a vehicle and virtual objects (e.g., beds, sofas, appliances, control panels, display panels, levers, knobs, buttons, or any other similar object) may be arranged therein. In some embodiments, the virtual environment may form part of a game instance of a virtual game, which may be a computer-implemented multiplayer online game. Also, the game instance may be uniquely associated with specific users.

At operation 606, the method 600 associates sections of the digital document to the virtual objects of the virtual environment, as may be performed by the document association module 418. For example, the document association module 418 may associate the various sections to the virtual objects with section descriptors. In some embodiments, section descriptors and virtual objects may both include location fields that indicate a location within the layout of the virtual environment. Such a location field can be used by a user interface to display the section descriptor and/or virtual object in the indicated location. In such embodiments, the method 600 may associate a section descriptor to the layout of virtual objects by assigning the section descriptor's location field with a value substantially near the location of the corresponding virtual object. In other embodiments, a virtual object may include a section descriptor field that associates the virtual object to the section descriptor. In such cases, any event relative to the virtual object may also be associated with the section descriptor. In yet other embodiments, the section descriptor may contain a virtual object field that identifies a corresponding virtual object. In this way, when processing the section descriptor, embodiments may access the virtual object identified in the section descriptor's virtual object field. For example, when determining the location of the virtual section, a user interface can access the corresponding virtual section to determine a location within the virtual environment.

At operation 608, the method 600 communicates data relating to the virtual environment to a client device, as may be performed by the communication module 420. Communicating the data relating to the virtual environment allows the client device to display the virtual environment to the user through a graphical user interface. The client device may run an application that displays the virtual environment. Because an application can display the virtual environment in any number of ways, the data relating to the virtual environment may differ depending on various embodiments. In one embodiment, the method 600 communicates data structures corresponding to the virtual objects and the corresponding section descriptors. In other embodiments, the method 600 only communicates out partial information relative to the virtual objects and the corresponding section descriptors to limit transmission costs, in terms of bandwidth consumption, for example. Such partial information may include only those virtual objects associated with an area of the virtual environment that is displayed by the client device 204. In other embodiments, a section descriptor is not sent until the game networking system 208.2 and/or the document system 208.3 receive a game event corresponding to a selection of the virtual object associated with the section descriptor.

Figure 9:
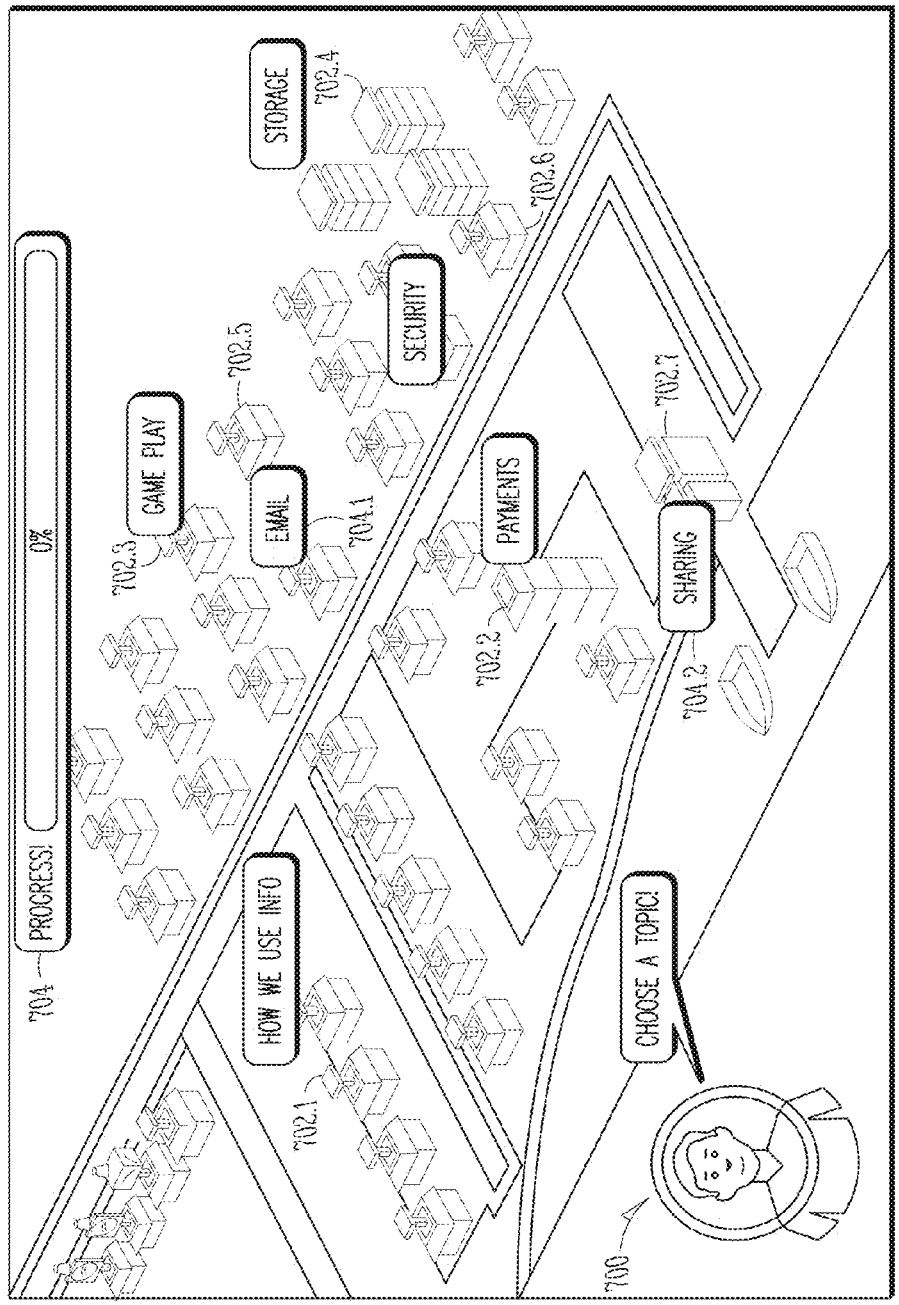
FIG. 9 shows an example of a user interface displaying a virtual environment, according to some embodiments.

FIG. 9 is a diagram that illustrates an example virtual environment 700, as may be displayed by a client device in response to receiving data relating to the virtual environment. As illustrated in FIG. 9, the virtual environment 700 shows a virtual city and various components or virtual structures of this city. Specifically, FIG. 9 shows that the virtual environment includes virtual objects 702.1-702.7 and a status indicator 704. The user may interact with various components of the city shown in FIG. 9.

FIG. 9 shows that each virtual object may be associated with a corresponding label. For example, virtual objects 702.5 and 702.7 are associated with labels 704.1 and 704.2, respectively. The label 704.1, which displays the text 'Email,' indicates an association with information relating to an email policy, for example. Label 704.2, which displays the text 'Sharing,' indicates an association with information relating to a section describing how information is shared.

The virtual environment may provide an interface to allow a user to interact with the elements displayed in the virtual environment 700. For example, as described below, a user may select a virtual object and/or a label shown in virtual environment 700. When the user interacts with the virtual environment, the status indicator 704 may be updated to show the user's progress in the virtual environment. In one example, the status indicator may show a progress indication relative to the section descriptors accessed by the user. For example, the status indicator may show a percentage of the section descriptors visited by the user relative to the total number of section descriptors that can be visited by the user.

In some embodiments, a user may select the virtual objects in any order. In other embodiments, the user may select the virtual objects 702.1-702.7 according to a predetermined order, such that the user is guided through the sections of the digital content. In yet other embodiments, some virtual objects 702.1-702.7 may be selected independent of each other, while other virtual objects can be selected depending on whether specific virtual objects have been previously selected.

Referring back to FIG. 8, the method 600, at operation 610, may monitor user interactions with the virtual environment, as may be performed by the monitor module 416. For example, the document system 208.3 may monitor event information that is communicated from the user's interaction with the client device. In other embodiments, the method 600 may perform operation 610 in a manner that allows for the client device to process the event information locally. For example, in some embodiments, the document system 208.3 communicates software code that, when executed by the client device, processes event information.

Once the client device 104 and/or the document system 208.3 detects that a virtual object has been selected, the method 600 may display information relating to the section of the digital document that is associated with the virtual object, as may be performed by the generation module 410. For example, the method may display a short summary, a title, an image, and one or more questions associated with the section. Such data may be stored in the attributes of the section descriptor, as shown in FIG. 7A, and may be retrieved from the document system 208.3 or the client device 104.

Figure 10A:
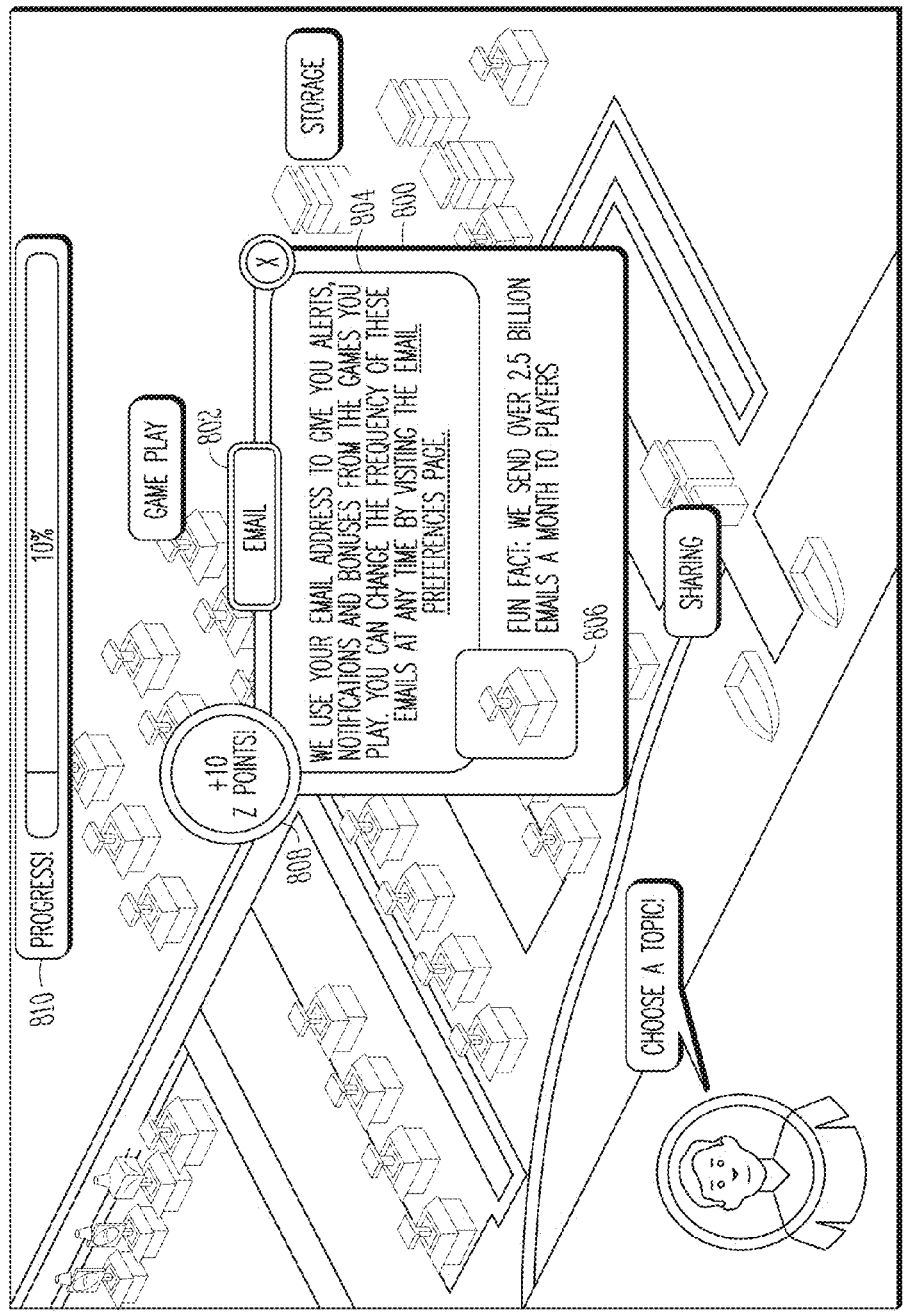
FIG. 10A shows an example of a user interface displaying information relating to a section of a digital document, according to some embodiments.

FIG. 10A is a diagram of a screen shot that shows an example section window 800 that displays information related to a specific section (i.e., an email section of a privacy document) of a digital document. As described above, a client device may display information regarding a section descriptor in response to a user clicking on (or otherwise activating) various aspects of the virtual environment. For example, by clicking on the virtual object 702.5 of FIG. 9, or corresponding label 704.1, the user device may display a section window that communicates information related to the email section of a privacy document. A "section window," as used herein, can refer to a user interface element that communicates information contained in a section descriptor.

As shown in FIG. 10A, the section window 800 may communicate information stored in the attributes of a section descriptor. FIG. 10A shows that the section window 800 may include a label field 802 that displays information corresponding to a label attribute of a section descriptor, a summary field 804 that corresponding to the summary attribute of the section descriptor, and an icon field 806 that corresponds to the icon attribute of the section descriptor. It is to be noted that the section window 800 may display any number of fields corresponding to attributes of a section descriptor.

In some embodiments, the system 100 may grant a virtual reward 808 to the user for selecting the virtual object associated with the section of the digital document. Virtual rewards are described in greater detail below.

As shown in FIG. 10A, aside from displaying a section window 800, selecting a virtual object associated with a section descriptor, or a corresponding label, may cause the client device to update the status indicator 810. For example, the status indicator may be incremented according to a weight associated with a section descriptor relative to the remaining section descriptors of a digital document. In other embodiments, the status indicator is a count of the section descriptors accessed by the user, and such a count is incremented every time the user visits a section descriptor not yet accessed.

FIG. 10B is a diagram that shows another example of a section window 820 that may be displayed on a client device after the user selects a different virtual object. For example, section window 820 may be displayed by the client device in response to the user selecting the virtual object 702.7 or the label 702.7 of FIG. 9. The section window 820 communicates information regarding a different section descriptor than the section window 800 of FIG. 10A. The section window 820 displays a short summary of the section 824, a label 826, and a reference 822 to the digital document. These fields may be based on the attributes of the associated section descriptor. Selecting the reference 822 may cause the client device to display the section of the digital document that is associated with the virtual object previously selected. For example, according to FIG. 10B, if the user selects the reference 822, the client device may display the "Sharing Your Information" section 834 of the digital document 830. The dashed arrow in FIG. 10B represents a change of display by the client device. It is to be appreciated that the other sections 832 of the digital document (e.g., "1. Introduction," "2, Information We Collect," and "3. Emailing") can refer to additional sections within the digital document that may separately be associated with other virtual objects in the virtual environment.

Integrating Iterative Feedback from the User

At determinable times, the document system 208.3 may interact with the user based on the virtual objects selected by the user. Such interactions may be performed by the feedback module 414 to receive feedback from the user. For example, the feedback module 414 may interact with the user after the user has selected a determinable number of virtual objects associated with sections of a digital document, while, in other example embodiments, the feedback module 414 may interact with the user after a determinable time period has elapsed.

The feedback module 414 can interact with the user in a number of ways. For example, in one embodiment, the feedback module 414 may provide a status indicator (e.g., a completion bar or a checklist) characterizing the progress of the user has made in receiving information relating to sections of the digital document. Such a status message may provide a user an incentive to continue with selecting the remaining virtual objects associated with sections of the digital document. In another example embodiment, the feedback module 414 may assign a virtual reward to the user for selecting the virtual objects.

Figure 11:
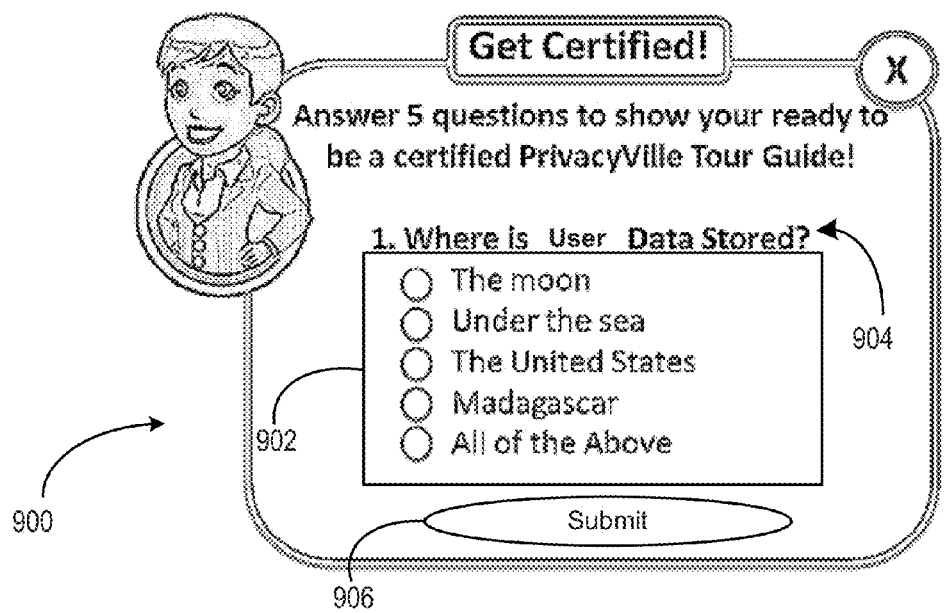
FIG. 11 shows an example of a user interface displaying a request message, according to some embodiments.

In yet another example embodiment, the feedback module 414 may communicate a request message to the user. A "request message," as used herein, may refer to any message that requests a response from the user. For example, a request message may pose a question to the user to determine the user's level of understanding of a particular section(s) of the digital document. To illustrate, FIG. 11 is a diagram that shows an example request message 900. As shown in FIG. 11, the request message 900 requests the user to answer a question 904 regarding information presented in one of the sections of the digital document. In particular, the request message asks the user to identify the location where user data information is stored. In some embodiments, the question presented by the feedback module 414 may be provided via an attribute of the section descriptor. (See attribute 512 of FIG. 7A, for example). Such a question attribute may store data used to present the question 904 and a set of options 902 that are selectable by the user.

After the user has selected an answer from the set of options 902, the user then selects the submit button 906 to have the feedback module 414 determine whether the user's answer is correct. If the answer submitted by the user is correct, the feedback module 414 may communicate another request message with a different query and set of options. If the answer submitted by the user is incorrect, the feedback module 414 may require the user to re-answer the previous question.

Figure 12:
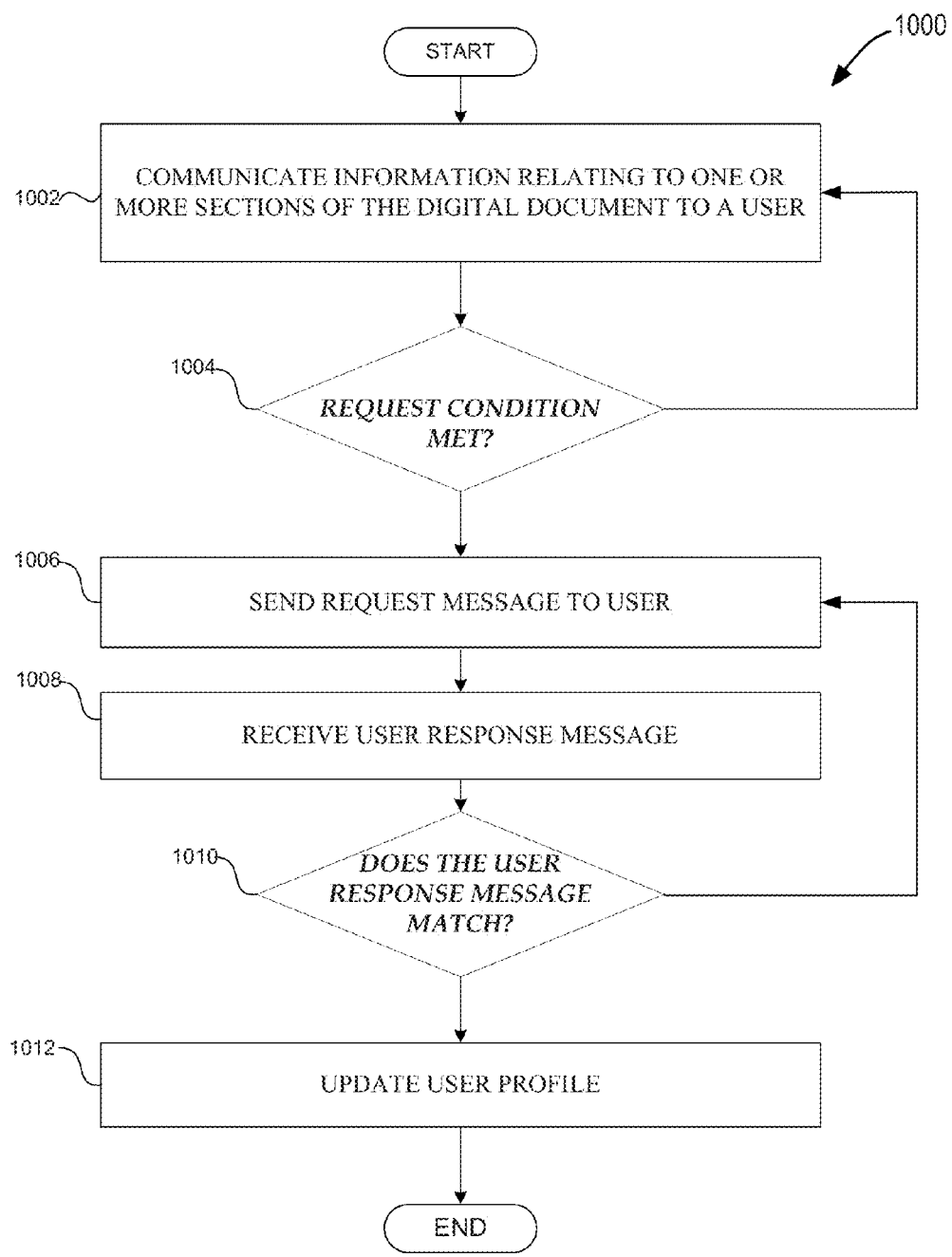
FIG. 12 is a flowchart showing an example method of receiving iterative feedback from a user, according to some embodiments.

FIG. 12 is a flowchart illustrating an example method 1000 for receiving iterative feedback from a user. In some embodiments, the method 1000 may be performed using any of the systems shown in the figures presented herein and, accordingly, is described by way of example with reference thereto.

The method 1000 may begin at operation 1002 when the document system 208.3 communicates information relating to one or more sections of a digital document to a client device. Operation 1002 may be performed according to the operation 610 of FIG. 8. For example, a user may interact with a client device to select a number of virtual object, or labels, displayed within the layout of a virtual environment. As described above, selecting the virtual object may cause the client device to display information regarding a section of the digital document. Such information may be displayed in a section window. (See, e.g., FIGS. 10A and 10B).

After the document system 208.3 communicates information relating to a predetermined number of sections, the document system 208.3 may determine that a request condition has been met. This is shown as operation 1004. A "request condition," as used herein, may refer to any condition that signifies that the feedback module 414 is to communicate a request message to the user. Communicating a request message to a user after the user accesses a predetermined number of section descriptors is one example of a request condition. The predetermined number of the request condition can be one, such that the document system 208.3 communicates the request message each time information related to a section is displayed by the client device or, in another embodiment, the predetermined number can equal the number of sections associated with a digital document, such that the feedback module 414 communicates the request message after the user has accessed all the section descriptors associated with the digital document. If the request condition has not been met, method 1000 then performs operation 1002 again; otherwise, the method 1000 performs operation 1006.

Operation 1006 involves communicating a request message to the user through the client device. As described above, according to one example embodiment, a question (e.g., as shown in FIG. 11, for example) is one example of a request message that may be communicated to a user device. Such a question may, for example, be generated by the feedback module 414 by using data stored in a question field of a section descriptor.

After the document system 208.3 communicates the request message to the client device at operation 1006, the user may submit a response message, which is then transmitted to and received by the document system 208.3. This is shown as operation 1008. In embodiments where the request message is a question, the client device may display a question to the user. The user may input an answer into the client device and then cause the client device to communicate a message containing the inputted answer to the document system 208.3.

At operation 1010, the feedback module 414 processes the user response message received at operation 1008. For example, if the response message includes an answer sent by client device, the feedback module 414 may then determine whether the submitted answer is correct. As described, the section descriptor described above may include an indication of the correct answer. In such cases, the response message may include an indication of the question being answered by the response message to allow the feedback module 414 to match the submitted answer with the expected answer.

In some embodiments, processing the user response may cause the feedback module 414 to update the user profile. This is shown as operation 1012. For example, in some embodiments, a user may be awarded a virtual reward for each question answered correctly. In such cases, the user profile may be updated to credit the user with some virtual reward. In other embodiments, the feedback module 414 may track the user's performance regarding each question. Thus, a correct answer may cause the feedback module 414 to update the user profile to reflect that the user submitted a correct answer, while an incorrect answer may cause the feedback module 414 to update the user profile to reflect that the user submitted an incorrect answer. In embodiments that track the user's performance, the user may be awarded with a virtual reward if, after a certain number of questions, the user has met a determinable performance metric (e.g., answering some percentage of questions correctly, or answering some number of questions correctly).

Although method 1000 is illustrated above using request and response messages that communicate questions and answers specific to the content of sections of a digital document, it is to be appreciated that other types of request and response messages may be utilized by other embodiments. For example, in some embodiments, the feedback module 414 may communicate a survey request to the user. In comparison section questions described above, a survey message attempts to gather information regarding the user's experience with the feedback module 414. Accordingly, the survey messages may ask the user to rate specific aspects of the user experience (e.g., the usefulness of the section descriptors, the ease of use, the effectiveness, etc). A survey message may also request the user to respond with a comments or suggestion.

Some embodiments may utilize a request message to determine whether to communicate supplemental information to the user. For example, a section window may include a user interface element that the user can select to cause the generation module 410 to communicate supplemental information regarding the section. This technique may be used to communicate clarifying summaries of some portions of the section. In some cases the clarifying summary may include different wording or phrases than the summary previously displayed in the section window. In other cases, the clarifying summary may go into certain aspects in greater detail.

With regard to the request messages for supplemental information, the customization module 412 may track the frequency a user is requesting for supplementary information in the user profile 472. In this way, when the document system 208.3 presents information regarding a section for the first time, the customization module 412 can compare the frequency that the user has requested supplementary information in the past with a threshold to determine if the document system 208.3 should automatically include the supplementary information in the current display. By automatically providing supplemental information when the user selects a virtual object, the system may reduce the communication bandwidth associated with re-communicating supplementary information when the user requests further information on a topic. Further, by adapting the content sent to a user, the user's experience is improved because they are receiving content tailored to their experience level.

Virtual Reward

As described above, in some embodiments, the document system 208.3 provides the user with a virtual reward for selecting virtual objects associated with sections of a digital document. Such virtual rewards may be provided through a rewards system 208.4 communicatively coupled to the document system 208.3. Accordingly, the virtual rewards obtained by accessing the section descriptors of the digital document may be used across a number of virtual games offered through the game networking system.

Figure 13:
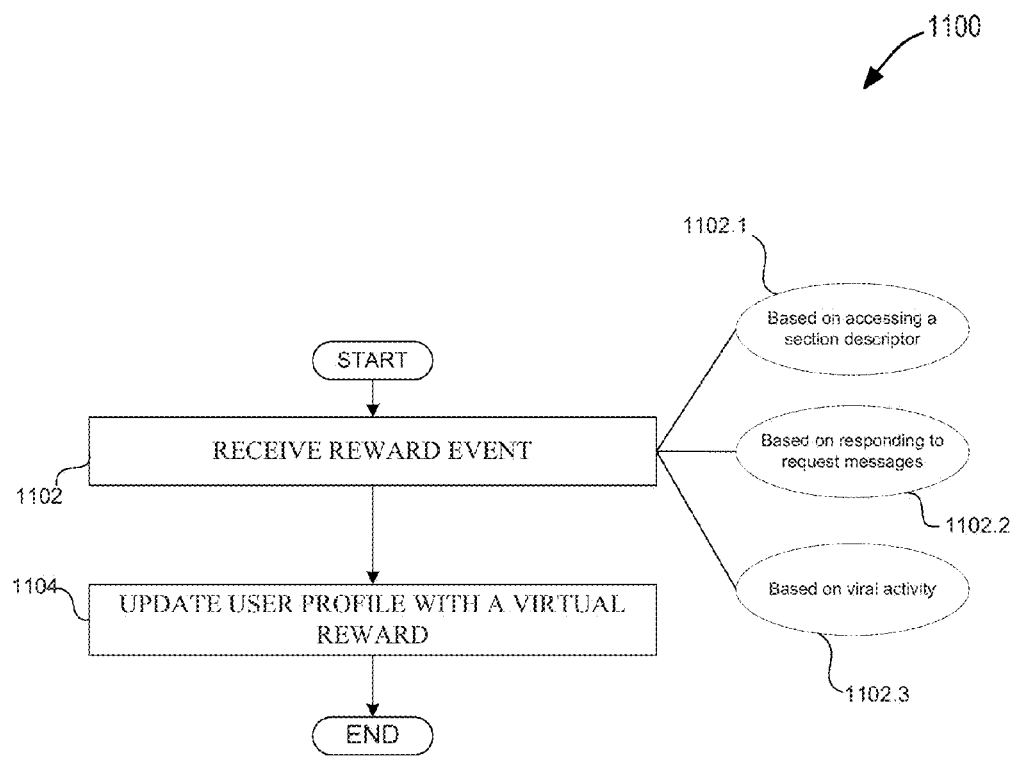
FIG. 13 is a flowchart showing an example method of granting a virtual reward to a user, according to some embodiments.

FIG. 13 is a flowchart illustrating an example method 1100 for granting a virtual reward to the user based on the user's interaction with the virtual environment. In some embodiments, the method 1100 may be performed using any of the systems shown in FIG. 2 and, accordingly, is described by way of example with reference thereto.

The method 1100 may begin at operation 1102, where the document system 208.3 receives a reward event. A "reward event," as used herein, may refer to any suitable event that signifies that the user earned a virtual reward. In one example embodiment, a virtual event is based on the user selecting a virtual object associated with a section of the digital document. This is shown as condition 1102.1. For example, the user device may communicate event information to the document system 208.3 that indicates that the user has selected a virtual object associated with a section descriptor. The event information may include an indication of the user and the section descriptor that is accessed. Responsive to receiving such event information, the document system 208.3 may determine if the user has accessed the section descriptor before. If not, the method may continue to operation 1104.

FIG. 13 shows that another condition that can qualify as a reward event is based on responding to a request message. This is shown as condition 1102.2. For example, the user device may communicate event information to the document system 208.3 that indicates that the user has correctly answered a question or a number of questions, as may be part of a quiz. The event information may include an indication of the user (e.g., a user identifier) and the section descriptor that is associated with the question, or a digital document. Responsive to receiving such event information, the document system 208.3 may determine if the user has accessed the section descriptor before. If not, the method 1100 may continue to operation 1104.

Still further, FIG. 13 shows viral activity may qualify as yet another condition for granting a virtual reward to the user. This is shown as condition 1102.3. For example, the user device may communicate event information to the document system 208.3 that indicates that the user submitted information regarding the user's interaction with the digital document and/or the virtual environment to a social platform. Viral activity is explained further below.

Once a reward event is detected, the document system 208.3 may then update the user profile to include a virtual reward. In some embodiments, the document system 208.3 may determine the virtual reward based on information stored in a section descriptor. In other embodiments, the virtual reward is based on other data, such as global data that maps certain activity to specific virtual rewards. For example, all viral activity may be associated with a specified virtual currency.

Integration with Game Networking Systems

As described above, some embodiments may embed the section descriptors in a virtual environment used by a game. As such, a game may include a tab to access the virtual environment with section descriptors of a tutorial, user guide, license agreement, and/or privacy statement. Moreover, each game can include such tabs to present an appropriate digital document specific to the game. Still further, the virtual reward associated with accessing the section descriptors may be specific to the game or general to a set of games.

Integration with Social Network Systems

In some embodiments, the user may post a reference to the virtual environment to viral platform, such as a social network system. Posting a Facebook message with a link to the virtual environment is one specific example of posting a reference to the virtual environment. In another embodiment, a user's profile on the social network system may be updated to indicate the user's status relative to the completion of the digital document. For example, the user may receive a badge that signifies that the user is knowledgeable in a particular subject described in the digital document. A user's knowledge may be determined by the feedback techniques described above.

Upon clicking the reference to the virtual environment, other users may interact with the virtual environment to access the section descriptors associated with the digital document.

Figure 14:
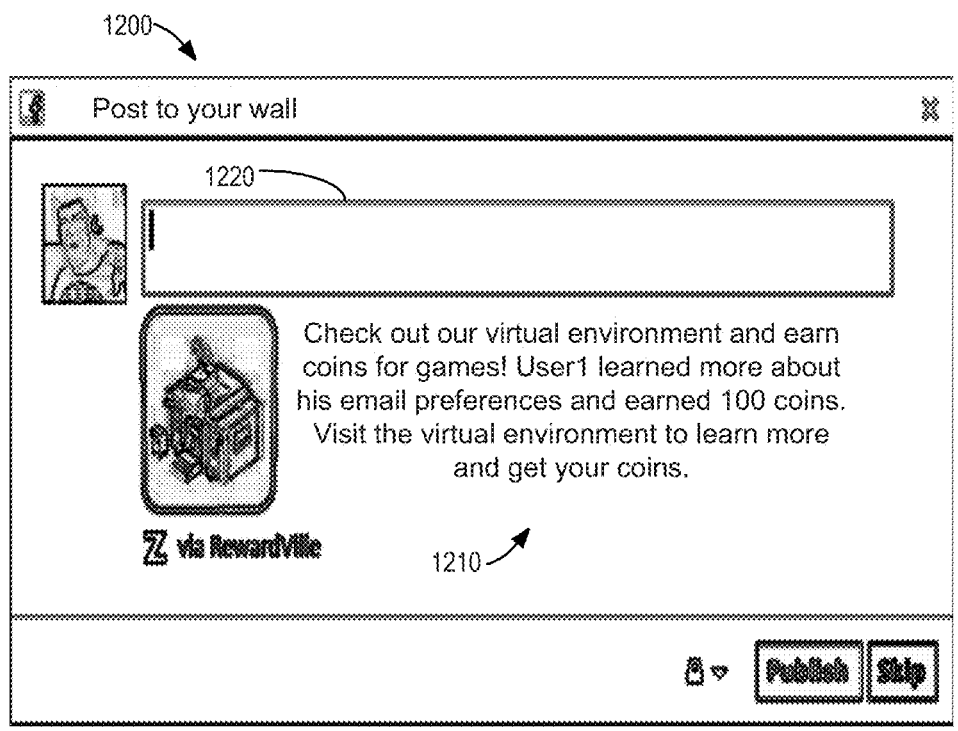
FIG. 14 is a diagram showing an example user interface used to post information regarding the virtual environment to the social network system, according to some embodiments.

FIG. 14 is a diagram that shows an example user interface 1200 that allows a user to post information regarding the virtual environment to the social network system. In particular, the user interface 1200, as may be provided by the document system 208.3, may include a template message 1210 that displays a message generated by the document system 208.3. The template message 1210 gives some control to the document system 208.3 to what content a user may submit to the social network system. The user interface 1200 may also include a dynamic message field 1220 for the user to enter in a specific message. The dynamic message field 1220 allows the user to control the content of the message that is communicated to the social network system.

Posting a reference to the virtual environment through a social network system provides a comparatively effective method for disseminating the virtual environment, and the sections of the digital document accessible therein, to additional users. Such is the case because it is more likely that the virtual environment is relevant to a friend of a user that has completed the virtual environment than a random user. Further, a friend is more likely to engage with a message sent from a friend than from a third-party because the friend may be considered a trusted source.

Example Game Systems, Social Networks, and Social Graphs

As described above, the systems described herein may include, communicate, or otherwise interact with a game system. As such, a game system is now described to illustrate further embodiments. In an online multiuser game, users control player characters (PCs), a game engine controls non-player characters (NPCs), and the game engine also manages player character state and tracks states for currently active (e.g., online) users and currently inactive (e.g., offline) users.

A player character may have a set of attributes and a set of friends associated with the player character. As used herein, the terms "state" and "attribute" can be used interchangeably to refer to any in-game characteristic of a player character, such as location, assets, levels, condition, health, status, inventory, skill set, name, orientation, affiliation, specialty, and so on. The game engine may use a player character state to determine the outcome of a game event, sometimes also considering set variables or random variables. Generally, an outcome is more favorable to a current player character (or player characters) when the player character has a better state. For example, a healthier player character is less likely to die in a particular encounter relative to a weaker player character or non-player character.

A game event may be an outcome of an engagement, a provision of access, rights and/or benefits or the obtaining of some assets (e.g., health, money, strength, inventory, land, etc.). A game engine may determine the outcome of a game event according to game rules (e.g., "a character with less than 5 health points will be prevented from initiating an attack"), based on a character's state and possibly also interactions of other player characters and a random calculation. Moreover, an engagement may include simple tasks (e.g., cross the river, shoot at an opponent), complex tasks (e.g., win a battle, unlock a puzzle, build a factory, rob a liquor store), or other events.

In a game system according to aspects of the present disclosure, in determining the outcome of a game event in a game being played by a user (or a group of more than one users), the game engine may take into account the state of the player character (or group of PCs) that is playing, but also the state of one or more PCs of offline/inactive users who are connected to the current user (or PC, or group of PCs) through the game social graph but are not necessarily involved in the game at the time.

For example, User A with six friends on User A's team (e.g., the friends that are listed as being in the user's mob/gang/set/army/business/crew/etc. depending on the nature of the game) may be playing the virtual game and choose to confront User B who has 20 friends on User B's team. In some embodiments, a user may only have first-degree friends on the user's team. In other embodiments, a user may also have second-degree and higher degree friends on the user's team. To resolve the game event, in some embodiments the game engine may total up the weapon strength of the seven members of User A's team and the weapon strength of the 21 members of User B's team and decide an outcome of the confrontation based on a random variable applied to a probability distribution that favors the side with the greater total. In some embodiments, all of this may be done without any other current active participants other than User A (e.g., User A's friends, User, B, and User B's friends could all be offline or inactive). In some embodiments, the friends in a user's team may see a change in their state as part of the outcome of the game event. In some embodiments, the state (assets, condition, level) of friends beyond the first degree are taken into account.

Example Game Networking Systems

A virtual game may be hosted by the game networking system 208.2, which can be accessed using any suitable connection 210 with a suitable client device 204. A user may have a game account on the game networking system 208.2, wherein the game account may contain a variety of information associated with the user (e.g., the user's personal information, financial information, purchase history, player character state, game state, etc.). In some embodiments, a user may play multiple games on the game networking system 208.2, which may maintain a single game account for the user with respect to the multiple games, or multiple individual game accounts for each game with respect to the user. In some embodiments, the game networking system 208.2 may assign a unique identifier to a user 202 of a virtual game hosted on the game networking system 208.2. The game networking system 208.2 may determine that the user 202 is accessing the virtual game by reading the user's cookies, which may be appended to HTTP requests transmitted by the client device 204, and/or by the user 202 logging onto the virtual game.

In some embodiments, the user 202 accesses a virtual game and control the game's progress via the client device 204 (e.g., by inputting commands to the game at the client device 204). The client device 204 can display the game interface, receive inputs from the user 202, transmit user inputs or other events to the game engine, and receive instructions from the game engine. The game engine can be executed on any suitable system (such as, for example, the client device 204, the social networking system 208.1, or the game networking system 208.2). For example, the client device 204 may download client components of a virtual game, which are executed locally, while a remote game server, such as the game networking system 208.2, provides backend support for the client components and may be responsible for maintaining application data of the game, processing the inputs from the user 102, updating and/or synchronizing the game state based on the game logic and each input from the user 202, and transmitting instructions to the client device 204. As another example, when the user 202 provides an input to the game through the client device 204 (such as, for example, by typing on the keyboard or clicking the mouse of the client device 204), the client components of the game may transmit the user's input to the game networking system 208.2.

In some embodiments, the user 202 accesses particular game instances of a virtual game. A game instance is a copy of a specific game play area that is created during runtime. In some embodiments, a game instance is a discrete game play area where one or more users 202 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables.

In some embodiments, a specific game instance may be associated with one or more specific users. A game instance is associated with a specific user when one or more game parameters of the game instance are associated with the specific user. For example, a game instance associated with a first user may be named "First User's Play Area." This game instance may be populated with the first user's PC and one or more in-game objects associated with the first user.

In some embodiments, a game instance associated with a specific user is only accessible by that specific user. For example, a first user may access a first game instance when playing a virtual game, and this first game instance may be inaccessible to all other users. In other embodiments, a game instance associated with a specific user is accessible by one or more other users, either synchronously or asynchronously with the specific user's game play. For example, a first user may be associated with a first game instance, but the first game instance may be accessed by all first-degree friends in the first user's social network.

In some embodiments, the set of in-game actions available to a specific user is different in a game instance that is associated with this user compared to a game instance that is not associated with this user. The set of in-game actions available to a specific user in a game instance associated with this user may be a subset, superset, or independent of the set of in-game actions available to this user in a game instance that is not associated with him. For example, a first user may be associated with Blackacre Farm in an online farming game, and may be able to plant crops on Blackacre Farm. If the first user accesses a game instance associated with another user, such as Whiteacre Farm, the game engine may not allow the first user to plant crops in that game instance. However, other in-game actions may be available to the first user, such as watering or fertilizing crops on Whiteacre Farm.

In some embodiments, a game engine interfaces with a social graph. Social graphs are models of connections between entities (e.g., individuals, users, contacts, friends, users, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. This disclosure assumes that at least one entity of a social graph is a user or player character in an online multiuser game.

In some embodiments, the social graph is managed by the game networking system 208.2, which is managed by the game operator. In other embodiments, the social graph is part of a social networking system 208.1 managed by a third party (e.g., Facebook, Friendster, Myspace). In yet other embodiments, the user 202 has a social network on both the game networking system 208.2 and the social networking system 208.1, wherein the user 202 can have a social network on the game networking system 208.2 that is a subset, superset, or independent of the user's social network on the social networking system 208.1. In such combined systems, game network system 208.2 can maintain social graph information with edge-type attributes that indicate whether a given friend is an "in-game friend," an "out-of-game friend," or both. The various embodiments disclosed herein are operable when the social graph is managed by the social networking system 208.1, the game networking system 208.2, or both.

Example Systems and Methods

Returning to FIG. 3, the User 301 may be associated, connected or linked to various other users, or "friends," within the out-of-game social network 350. These associations, connections or links can track relationships between users within the out-of-game social network 350 and are commonly referred to as online "friends" or "friendships" between users. Each friend or friendship in a particular user's social network within a social graph is commonly referred to as a "node." For purposes of illustration, the details of out-of-game social network 350 are described in relation to User 301. As used herein, the terms "user" and "player" can be used interchangeably and can refer to any user in an online multiuser game system or social networking system. As used herein, the term "friend" can mean any node within a user's social network.

As shown in FIG. 3, User 301 has direct connections with several friends. When User 301 has a direct connection with another individual, that connection is referred to as a first-degree friend. In out-of-game social network 350, User 301 has two first-degree friends. That is, User 301 is directly connected to Friend $1_1$ 311 and Friend $2_1$ 321. In social graph 300, it is possible for individuals to be connected to other individuals through their first-degree friends (e.g., friends of friends). As described above, the number of edges in a minimum path that connects a user to another user is considered the degree of separation. For example, FIG. 3 shows that User 301 has three second-degree friends to which User 301 is connected via User 301's connection to User 301's first-degree friends. Second-degree Friend $1_2$ 312 and Friend $2_2$ 322 are connected to User 301 via User 301's first-degree Friend $1_1$ 311. The limit on the depth of friend connections, or the number of degrees of separation for associations, that User 301 is allowed is typically dictated by the restrictions and policies implemented by the social networking system 208.1.

In various embodiments, User 301 can have Nth-degree friends connected to him through a chain of intermediary degree friends as indicated in FIG. 3. For example, Nth-degree Friend $1_N$ 319 is connected to User 301 within in-game social network 360 via second-degree Friend $3_2$ 332 and one or more other higher-degree friends.

In some embodiments, a user (or player character) has a social graph within an online multiuser game that is maintained by the game engine and another social graph maintained by a separate social networking system. FIG. 3 depicts an example of in-game social network 360 and out-of-game social network 350. In this example, User 301 has out-of-game connections 355 to a plurality of friends, forming out-of-game social network 350. Here, Friend $1_1$ 311 and Friend $2_1$ 321 are first-degree friends with User 301 in User 301's out-of-game social network 350. User 301 also has in-game connections 365 to a plurality of users, forming in-game social network 360. Here, Friend $2_1$ 321, Friend $3_1$ 331, and Friend $4_1$ 341 are first-degree friends with User 301 in User 301's in-game social network 360. In some embodiments, a game engine can access in-game social network 360, out-of-game social network 350, or both.

In some embodiments, the connections in a user's in-game social network is formed both explicitly (e.g., when users "friend" each other) and implicitly (e.g., when the system observes user behaviors and "friends" users to each other). Unless otherwise indicated, reference to a friend connection between two or more users can be interpreted to cover both explicit and implicit connections, using one or more social graphs and other factors to infer friend connections. The friend connections can be unidirectional or bidirectional. It is also not a limitation of this description that two users who are deemed "friends" for the purposes of this disclosure are not friends in real life (e.g., in disintermediated interactions or the like), but that could be the case.

Figure 15:
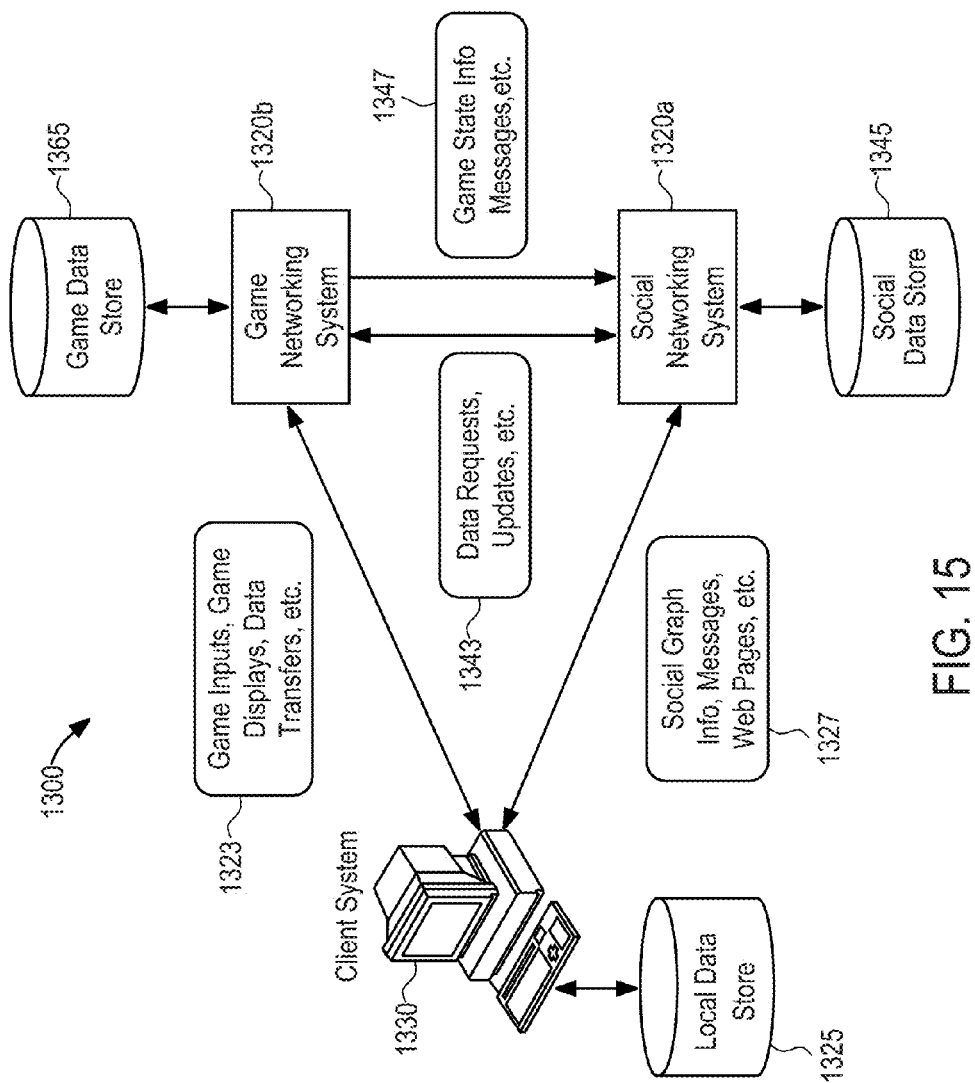
FIG. 15 illustrates an example data flow between example components of the example system of FIG. 2, according to some embodiments.

FIG. 15 illustrates an example data flow between example components of an example system 1300. One or more of the components of the example system 1300 may correspond to one or more of the components of the example system 200. In some embodiments, system 1300 includes a client system 1330, a social networking system 1320a, and a game networking system 1320b. The components of system 1300 can be connected to each other in any suitable configuration, using any suitable type of connection. The components may be connected directly or over any suitable network. The client system 1330, the social networking system 1320a, and the game networking system 1320b may have one or more corresponding data stores such as the local data store 1325, the social data store 1345, and the game data store 1365, respectively.

The client system 1330 may receive and transmit data 1323 to and from the game networking system 1320b. This data can include, for example, a web page, a message, a game input, a game display, a HTTP packet, a data request, transaction information, and other suitable data. At some other time, or at the same time, the game networking system 1320b may communicate data 1343, 1347 (e.g., game state information, game system account information, page info, messages, data requests, updates, etc.) with other networking systems, such as the social networking system 1320*a* (e.g., Facebook, Myspace, etc.). The client system 1330 can also receive and transmit data 1327 to and from the social networking system 1320*a*. This data can include, for example, web pages, messages, social graph information, social network displays, HTTP packets, data requests, transaction information, updates, and other suitable data.

Communication between the client system 1330, the social networking system 1320*a*, and the game networking system 1320*b* can occur over any appropriate electronic communication medium or network using any suitable communications protocols. For example, the client system 1330, as well as various servers of the systems described herein, may include Transport Control Protocol/Internet Protocol (TCP/IP) networking stacks to provide for datagram and transport functions. Of course, any other suitable network and transport layer protocols can be utilized.

In some embodiments, an instance of a virtual game is stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a user accesses a virtual game on the game networking system 1320*b*, the BLOB containing the game state for the instance corresponding to the user may be transmitted to the client system 1330 for use by a client-side executed object to process. In some embodiments, the client-side executable is a FLASH-based game, which can de-serialize the game state data in the BLOB. As a user plays the game, the game logic implemented at the client system 1330 maintains and modifies the various game state parameters locally. The client-side game logic may also batch game events, such as mouse clicks, and transmit these events to the game networking system 1320*b*. Game networking system 1320*b* may itself operate by retrieving a copy of the BLOB from a database or an intermediate memory cache (memcache) layer. The game networking system 1320*b* can also de-serialize the BLOB to resolve the game state parameters and execute its own game logic based on the events in the batch file of events transmitted by the client to synchronize the game state on the server side. The game networking system 1320*b* may then re-serialize the game state, now modified into a BLOB, and pass this to a memory cache layer for lazy updates to a persistent database.

In some embodiments, a computer-implemented game is a text-based or turn-based game implemented as a series of web pages that are generated after a user selects one or more actions to perform. The web pages may be displayed in a browser client executed on the client system 1330. For example, a client application downloaded to the client system 1330 may operate to serve a set of web pages to a user. As another example, a virtual game may be an animated or rendered game executable as a stand-alone application or within the context of a webpage or other structured document. In some embodiments, the virtual game is implemented using Adobe Flash-based technologies. As an example, a game may be fully or partially implemented as a SWF object that is embedded in a web page and executable by a Flash media user plug-in. In some embodiments, one or more described web pages is associated with or accessed by the social networking system 1320*a*. This disclosure contemplates using any suitable application for the retrieval and rendering of structured documents hosted by any suitable network-addressable resource or website.

Application event data of a game is any data relevant to the game (e.g., user inputs). In some embodiments, each application datum may have a name and a value, and the value of the application datum may change (e.g., be updated) at any time. When an update to an application datum occurs at the client system 1330, either caused by an action of a game user or by the game logic itself, the client system 1330 may need to inform the game networking system 1320*b* of the update. For example, if the game is a farming game with a harvest mechanic (such as Zynga FarmVille), an event can correspond to a user clicking on a parcel of land to harvest a crop. In such an instance, the application event data may identify an event or action (e.g., harvest) and an object in the game to which the event or action applies.

In some embodiments, one or more objects of a game is represented as an Adobe Flash object. Flash may manipulate vector and raster graphics, and supports bidirectional streaming of audio and video. "Flash" may mean the authoring environment, the user, or the application files. In some embodiments, the client system 1330 may include a Flash client. The Flash client may be configured to receive and run Flash application or game object code from any suitable networking system (such as, for example, the social networking system 1320*a* or the game networking system 1320*b*). In some embodiments, the Flash client is run in a browser client executed on the client system 1330. A user can interact with Flash objects using the client system 1330 and the Flash client. The Flash objects can represent a variety of in-game objects. Thus, the user may perform various in-game actions on various in-game objects by making various changes and updates to the associated Flash objects.

In some embodiments, in-game actions are initiated by clicking or similarly interacting with a Flash object that represents a particular in-game object. For example, a user can interact with a Flash object to use, move, rotate, delete, attack, shoot, or harvest an in-game object. This disclosure contemplates performing any suitable in-game action by interacting with any suitable Flash object. In some embodiments, when the user makes a change to a Flash object representing an in-game object, the client-executed game logic may update one or more game state parameters associated with the in-game object. To ensure synchronization between the Flash object shown to the user at the client system 1330, the Flash client may send the events that caused the game state changes to the in-game object to the game networking system 1320*b*. However, to expedite the processing and hence the speed of the overall gaming experience, the Flash client may collect a batch of some number of events or updates into a batch file. The number of events or updates may be determined by the Flash client dynamically or determined by the game networking system 1320*b* based on server loads or other factors. For example, client system 1330 may send a batch file to the game networking system 1320*b* whenever 50 updates have been collected or after a threshold period of time, such as every minute.

As used herein, the term "application event data" may refer to any data relevant to a computer-implemented virtual game application that may affect one or more game state parameters, including, for example and without limitation, changes to user data or metadata, changes to user social connections or contacts, user inputs to the game, and events generated by the game logic. In some embodiments, each application datum has a name and a value. The value of an application datum may change at any time in response to the game play of a user or in response to the game engine (e.g., based on the game logic). In some embodiments, an application data update occurs when the value of a specific application datum is changed.

In some embodiments, when a user plays a virtual game on the client system 1330, the game networking system 1320*b* serializes all the game-related data, including, for example and without limitation, game states, game events, user inputs, for this particular user and this particular game into a BLOB and may store the BLOB in a database. The BLOB may be associated with an identifier that indicates that the BLOB contains the serialized game-related data for a particular user and a particular virtual game. In some embodiments, while a user is not playing the virtual game, the corresponding BLOB may be stored in the database. This enables a user to stop playing the game at any time without losing the current state of the game the user is in. When a user resumes playing the game next time, game networking system 1320*b* may retrieve the corresponding BLOB from the database to determine the most-recent values of the game-related data. In some embodiments, while a user is playing the virtual game, the game networking system 1320*b* also loads the corresponding BLOB into a memory cache so that the game system may have faster access to the BLOB and the game-related data contained therein.

Figure 16:
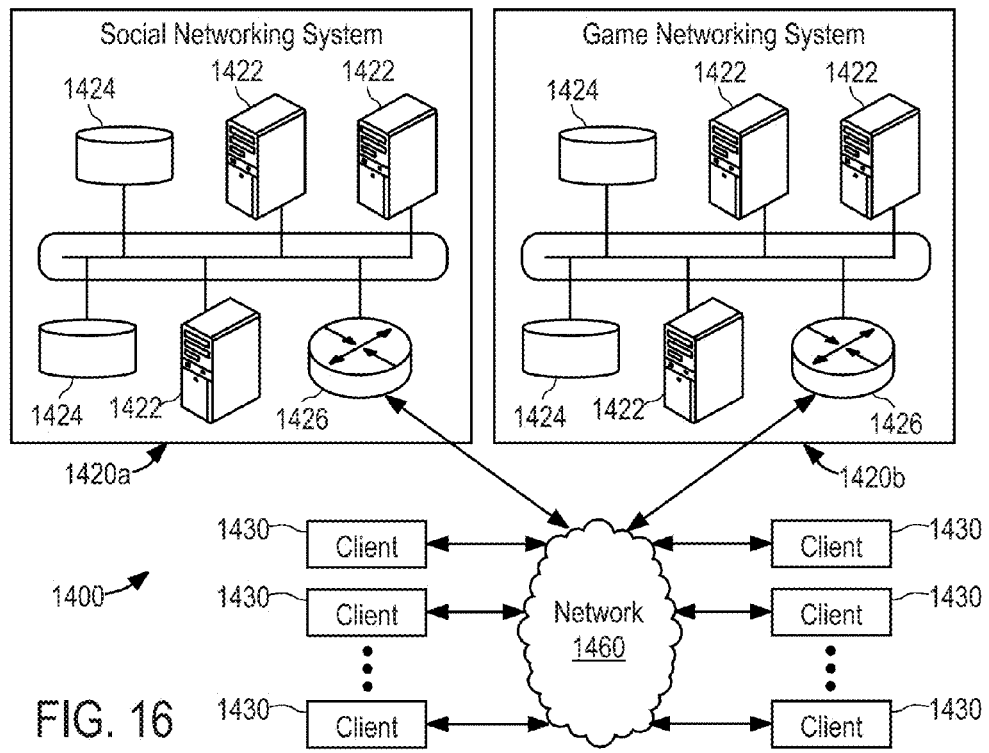
FIG. 16 illustrates an example network environment, in which various example embodiments may operate.

Various embodiments may operate in a wide area network environment, such as the Internet, including multiple network addressable systems. FIG. 16 illustrates an example network environment 1400, in which various example embodiments may operate. Network cloud 1460 generally represents one or more interconnected networks, over which the systems and hosts described herein can communicate. Network cloud 1460 may include packet-based wide area networks (such as the Internet), private networks, wireless networks, satellite networks, cellular networks, paging networks, and the like. As FIG. 16 illustrates, various embodiments may operate in a network environment 1400 comprising one or more networking systems, such as a social networking system 1420*a*, a game networking system 1420*b*, and one or more client systems 1430. The components of the social networking system 1420*a* and the game networking system 1420*b* operate analogously; as such, hereinafter they may be referred to simply as the networking system 1420. The client systems 1430 are operably connected to the network environment 1400 via a network service provider, a wireless carrier, or any other suitable means.

The networking system 1420 is a network addressable system that, in various example embodiments, comprises one or more physical servers 1422 and data stores 1424. The one or more physical servers 1422 are operably connected to computer network cloud 1460 via, by way of example, a set of routers and/or networking switches 1426. In an example embodiment, the functionality hosted by the one or more physical servers 1422 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), Flash, ActionScript, and the like.

The physical servers 1422 may host functionality directed to the operations of the networking system 1420. Hereinafter servers 1422 may be referred to as server 1422, although the server 1422 may include numerous servers hosting, for example, the networking system 1420, as well as other content distribution servers, data stores, and databases. Data store 1424 may store content and data relating to, and enabling, operation of, the networking system 1420 as digital data objects. A data object, in some embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc.

Logically, data store 1424 corresponds to one or more of a variety of separate and integrated databases, such as relational databases and object-oriented databases, that maintain information as an integrated collection of logically related records or files stored on one or more physical systems. Structurally, data store 1424 may generally include one or more of a large class of data storage and management systems. In some embodiments, data store 1424 may be implemented by any suitable physical system(s) including components, such as one or more database servers, mass storage media, media library systems, storage area networks, data storage clouds, and the like. In one example embodiment, data store 1424 includes one or more servers, databases (e.g., MySQL), and/or data warehouses. Data store 1424 may include data associated with different networking system 1420 users and/or client systems 1430.

The client system 1430 is generally a computer or computing device including functionality for communicating (e.g., remotely) over a computer network. The client system 1430 may be a desktop computer, laptop computer, personal digital assistant (PDA), in- or out-of-car navigation system, smart phone or other cellular or mobile phone, or mobile gaming device, among other suitable computing devices. Client system 1430 may execute one or more client applications, such as a Web browser.

When a user at a client system 1430 desires to view a particular webpage (hereinafter also referred to as target structured document) hosted by the networking system 1420, the user's web browser, or other document rendering engine or suitable client application, formulates and transmits a request to the networking system 1420. The request generally includes a URL or other document identifier as well as metadata or other information. By way of example, the request may include information identifying the user, a timestamp identifying when the request was transmitted, and/or location information identifying a geographic location of the user's client system 1430 or a logical network location of the user's client system 1430.

Although the example network environment 1400 described above and illustrated in FIG. 16 is described with respect to the social networking system 1420*a* and the game networking system 1420*b*, this disclosure encompasses any suitable network environment using any suitable systems. For example, a network environment may include online media systems, online reviewing systems, online search engines, online advertising systems, or any combination of two or more such systems.

Figure 17:
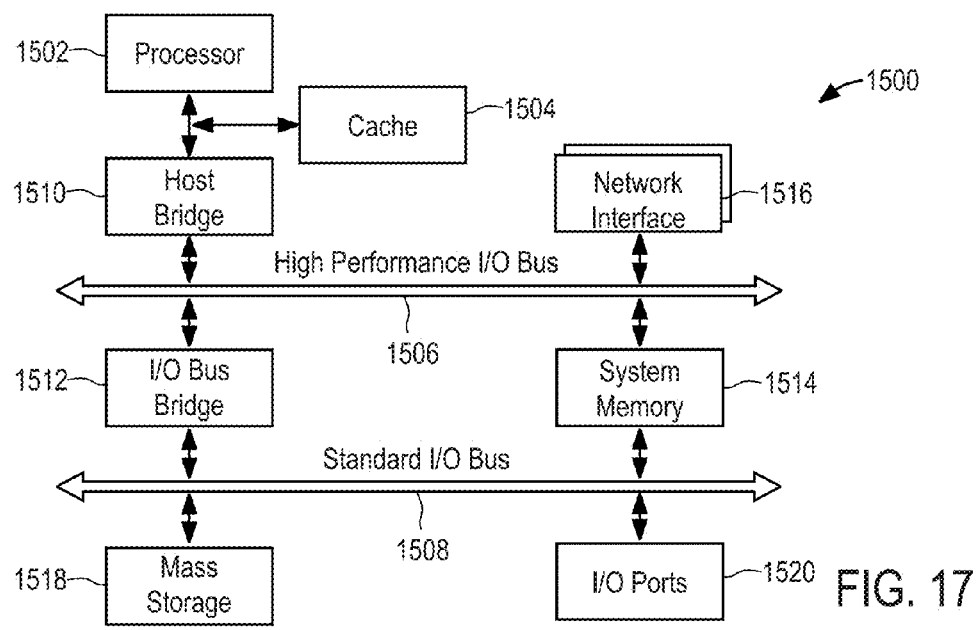
FIG. 17 illustrates an example computing system architecture, which may be used to implement one or more of the methodologies described herein, according to some embodiments.

FIG. 17 illustrates an example computing system architecture, which may be used to implement a server 1422 or a client system 1430. In one embodiment, the hardware system 1500 comprises a processor 1502, a cache memory 1504, and one or more executable modules and drivers, stored on a tangible computer-readable storage medium, directed to the functions described herein. Additionally, the hardware system 1500 may include a high performance input/output (I/O) bus 1506 and a standard I/O bus 1508. A host bridge 1510 may couple the processor 1502 to the high performance I/O bus 1506, whereas the I/O bus bridge 1512 couples the two buses 1506 and 1508 to each other. A system memory 1514 and one or more network/communication interfaces 1516 may couple to the bus 1506. The hardware system 1500 may further include video memory (not shown) and a display device coupled to the video memory. Mass storage 1518 and I/O ports 1520 may couple to the bus 1508. The hardware system 1500 may optionally include a keyboard, a pointing device, and a display device (not shown) coupled to the bus 1508. Collectively, these elements are intended to represent a broad category of computer hardware systems.

The elements of the hardware system 1500 are described in greater detail below. In particular, the network interface 1516 provides communication between the hardware system 1500 and any of a wide range of networks, such as an Ethernet (e.g., IEEE 802.3) network, a backplane, etc. The mass storage 1518 provides permanent storage for the data and programming instructions to perform the above-described functions implemented in servers 1422 of FIG. 16, whereas system memory 1514 (e.g., DRAM) provides temporary storage for the data and programming instructions when executed by the processor 1502. I/O ports 1520 are one or more serial and/or parallel communication ports that provide communication between additional peripheral devices, which may be coupled to the hardware system 1500.

The hardware system 1500 may include a variety of system architectures and various components of the hardware system 1500 may be rearranged. For example, cache memory 1504 may be on-chip with the processor 1502. Alternatively, the cache memory 1504 and the processor 1502 may be packed together as a "processor module," with processor 1502 being referred to as the "processor core." Furthermore, certain embodiments of the present disclosure may neither require nor include all of the above components. For example, the peripheral devices shown coupled to the standard I/O bus 1508 may couple to the high performance I/O bus 1506. In addition, in some embodiments, only a single bus may exist, with the components of the hardware system 1500 being coupled to the single bus. Furthermore, the hardware system 1500 may include additional components, such as additional processors, storage devices, or memories.

An operating system manages and controls the operation of the hardware system 1500, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the embodiments can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer implemented method comprising:
generating a virtual environment with a plurality of virtual objects, each virtual object having an association with a section of a digital document, wherein the virtual environment comprises a virtual city environment rendered to concurrently display each virtual object, wherein the plurality of virtual objects includes a first virtual object of a first type of city structure and a second virtual object of a second type of city structure, the first type of city structure different than the second type of city structure;
monitoring user interactions with the virtual environment; and
in response to detecting a selection of one of the virtual objects, providing a display of information relating to the section of the digital document associated with the selected virtual object.

2. The computer implemented method of claim 1, wherein the providing the display of information includes displaying text relating to the section in the virtual environment.

3. The computer implemented method of claim 1, wherein the providing the display of the information includes displaying the actual text of the section in the virtual environment.

4. The computer implemented method of claim 1, wherein the providing the display of the information includes displaying the information in a pop-up window and monitoring closing of the pop-up window by the user.

5. The computer implemented method of claim 1, further comprising providing a user with an indication that identifies which virtual objects have been selected by the user.

6. The computer implemented method of claim 1, further comprising providing prompts to a user to identify virtual objects that are selectable for a first time.

7. The computer implemented method of claim 1, further comprising storing an indication that the information relating to the section of the digital document has been displayed.

8. The computer implemented method of claim 7, wherein the storing of the indication is performed by sending a message to a server computer system.

9. The computer implemented method of claim 1, further comprising awarding a virtual reward to a user account in response to the detection of the selection of the virtual object, wherein the virtual reward is awarded to the user based on the user selecting all of the virtual objects having associations with the digital document.

10. The computer implemented method of claim 1, wherein the selected virtual object represents a physical structure depicted in the virtual environment.

11. The computer implemented method of claim 10, wherein the physical structure is related to a content of the section of the digital document.

12. The computer implemented method of claim 1, further comprising displaying a label proximate to an associated virtual structure, the label describing content of the section associated with the virtual structure.

13. The computer implemented method of claim 1, further comprising sending an indication of the virtual environment to a social network, the indication allowing other users access the virtual environment.

14. The computer implemented method of claim 1, wherein the virtual environment represents a city, a town, a settlement, a farm, a garden, an estate, a territory, a geographic region, a room, a worksite, or a building.

15. The computer implemented method of claim 1, wherein the digital document is at least one of a privacy agreement or statement, a user manual, educational material, training material, or a tutorial.

16. The computer implemented method of claim 1, wherein the information relating to the section is obtained by accessing a section descriptor linked to the section, the section descriptor having attributes associated with the section.

17. The computer implemented method of claim 1, wherein the virtual city environment comprises a virtual online game city environment.

18. A computer system comprising:
  at least one processor;
  a document association module implemented by the at least one processor and configured to generate a virtual environment with a plurality of virtual objects, each virtual object having an association with a section of a digital document, wherein the virtual environment comprises a virtual city environment rendered to concurrently display each virtual object, wherein the plurality of virtual objects includes a first virtual object of a first type of city structure and a second virtual object of a second type of city structure, the first type of city structure different than the second type of city structure;
  a monitor module implemented by the at least one processor and configured to monitoring user interactions with the virtual environment; and
  a generation module implemented by the at least one processor and configured to, responsive to detecting a selection of one of the virtual objects, provide a display of information relating to the section of the digital document associated with the selected virtual object.

19. The computer system of claim 18, further comprising a feedback module implemented by the at least one process and configured to store an indication that the information relating to the section of the digital document has been displayed.

20. The computer system of claim 19, wherein the feedback module sends a message to a server computer system.

21. The computer system of claim 18, further comprising a feedback module implemented by the at least one process and configured to award a virtual reward to a user account in response to the detection of the selection of the virtual object.

22. The computer system of claim 21, wherein the virtual reward is awarded to the user based on the user selecting all of the virtual objects associated with the virtual objects.

23. The computer system of claim 18, wherein the selected virtual object represents a physical structure depicted in the virtual environment.

24. The computer system of claim 18, wherein the virtual environment represents a city, a town, a settlement, a farm, a garden, an estate, a territory, a geographic region, a room, a worksite, or a building.

25. The computer system of claim 18, wherein the digital document is at least one of a privacy agreement or statement, a user manual, educational material, training material, or a tutorial.

26. The computer system of claim 18, wherein the information relating to the section is obtained by accessing a section descriptor linked to the section, the section descriptor having attributes associated with the section.

27. A computer-readable storage medium storing instructions for causing a processor to implement operations, the operations comprising:
  generating a virtual environment with a plurality of virtual objects, each virtual object having an association with a section of a digital document, wherein the virtual environment comprises a virtual city environment rendered to concurrently display each virtual object, wherein the plurality of virtual objects includes a first virtual object of a first type of city structure and a second virtual object of a second type of city structure, the first type of city structure different than the second type of city structure;
  monitoring user interactions with the virtual environment; and
  in response to detecting a selection of data relating to a virtual object of the plurality of virtual objects, providing a display of information relating to the section of the digital document associated with the virtual object.

28. A computer implemented method comprising:
  monitoring user interactions with information related to a digital document, the information related to the digital document being displayed in response to detecting one or more user selections of virtual objects of a virtual environment, wherein the virtual environment comprises a virtual city environment rendered to concurrently display each virtual object, wherein the plurality of virtual objects includes a first virtual object of a first type of city structure and a second virtual object of a second type of city structure, the first type of city structure different than the second type of city structure; and
  in response to detecting a user interaction with the information related to the digital document, awarding a virtual reward to a user account associated with a game system.

29. The computer implemented method of claim 28, wherein the user interaction being at least one of accessing information related to a section of the digital document for a first time, accessing information related to all sections of the digital document, or answering one or more questions related to the digital document.

30. The computer implemented method of claim 28, further comprising, in response to detecting that a user has posted an indication of the virtual environment to a social network, awarding an additional virtual reward to the user account associated with the game system.

* * * * *